(12) United States Patent
Joubert et al.

(10) Patent No.: US 8,085,370 B2
(45) Date of Patent: Dec. 27, 2011

(54) SINGLE-POLARIZER REFLECTIVE BISTABLE TWISTED NEMATIC (BTN) LIQUID CRYSTAL DISPLAY DEVICE

(75) Inventors: Cécile Joubert, Orsay (FR); Terry Scheffer, Hilo, HI (US)

(73) Assignee: Nemoptic, Magny les Hameaux (FR)

( * ) Notice: Subject to any disclaimer, the term of this patent is extended or adjusted under 35 U.S.C. 154(b) by 594 days.

(21) Appl. No.: 11/920,933

(22) PCT Filed: May 10, 2006

(86) PCT No.: PCT/EP2006/062203
§ 371 (c)(1),
(2), (4) Date: Mar. 12, 2009

(87) PCT Pub. No.: WO2006/122899
PCT Pub. Date: Nov. 23, 2006

(65) Prior Publication Data
US 2009/0213312 A1    Aug. 27, 2009

(30) Foreign Application Priority Data
May 20, 2005    (EP) .................................. 05291087

(51) Int. Cl.
*G02F 1/1335*    (2006.01)
(52) U.S. Cl. .......................... 349/118; 349/120; 349/123
(58) Field of Classification Search .................. None
See application file for complete search history.

(56) References Cited

U.S. PATENT DOCUMENTS
6,765,640 B1    7/2004    Acosta et al.
(Continued)

FOREIGN PATENT DOCUMENTS
EP    1170624    1/2002
(Continued)

OTHER PUBLICATIONS

Guo, J.X., et al.; "*Retardation-Film-Compensated Reflective Bistable Twisted Nematic Liquid-Crystal Displays*"; Applied Optics, OSA Optical Society of America, Washington, D.C.; vol. 42, No. 19; Jul. 1, 2003; pp. 3853-3863.

(Continued)

*Primary Examiner* — Hemang Sanghavi
(74) *Attorney, Agent, or Firm* — Blakely, Sokoloff, Taylor & Zafman

(57) ABSTRACT

The application relates to a single-polarizer reflective bistable twisted nematic (BTN) liquid crystal display device comprising a liquid crystal layer of thickness d, birefringence $\Delta n$ and retardation $\Delta nd$, said liquid crystal layer being situated between two substrates and between a polarizer and a reflector, said liquid crystal layer in the absence of an applied electric field having two stable uniformly twisted textures, the twists of the two stable textures differing by an angle being equal mainly to 180°, and at least one compensation layer positioned between said polarizer and said reflector, said compensation layer being composed of at least one birefringent film, said birefringent film having an optical anisotropy defined by three characteristic refractive indices $n_x$, $n_y$, $n_z$, along three corresponding axis x, y, z of index ellipsoid, x and y being situated inside the substrates plane, $n_x$ and $n_y$ being called in plane indices, with $n_x \geq n_y$, x being called slow axis, and z being perpendicular to the substrates plane with biaxiality parameter $N_z$ equal to $(n_x-n_z)/(n_x-n_y)$, characterized in that $N_z$ lies between $-\infty$ and ½ so that under oblique viewing the retardation of the stable texture corresponding to the dark state is compensated to improve the contrast ratio and simultaneously the retardation of the stable texture corresponding to the bright state is modified to decrease the color shift.

25 Claims, 24 Drawing Sheets

U.S. PATENT DOCUMENTS

| | | | |
|---|---|---|---|
| 2001/0012080 | A1 | 8/2001 | Barberi et al. |
| 2003/0128314 | A1 | 7/2003 | Dozov et al. |
| 2004/0125294 | A1* | 7/2004 | Angele et al. ............... 349/123 |
| 2006/0177607 | A1* | 8/2006 | Ohmori et al. ............... 428/1.31 |

FOREIGN PATENT DOCUMENTS

WO    WO 02-27393    4/2002

OTHER PUBLICATIONS

Lazarev, Pavel, et al.; "*P-6 Submicron Thin Retardation Coating*"; SID 01 Digest; vol. XXXII; 2001; pp. 571-573.

Wang, Bin et al.; "*Design Optimized Twisted Nematic Liquid Crystal Display*"; Journal of Applied Physics, American Institute of Physics; New York; vol. 90, No. 2; Jul. 15, 2001; pp. 552-555.

Cheng, H. et al.; "*Optimization of Film Compensated Refelective Bistable Twisted Nematic Liquid Crystal Displays*"; Molecular Crystals and Liquid Crystals Science and Technology, Section A, Molecular Crystals and Liquid Crystals, Gordon and Breach Publishers; vol. 369; 2001; pp. 83-94.

Xie, Z.L. et al.; "*Optimization of Reflective Bistable Twisted Nematic Displays with Retardation Compensation*"; Journal of Applied Physics, American Institute of Physics; Aug. 15, 2000; vol. 88, No. 4; pp. 1718-1721.

Zhou, F. et al.; "*P-109: Optimization of Film Compensated Reflective Bistable TN Displays*"; 2005 SID International Symposium; Boston, MA., May 24-27, 2005 SID International Symposium, San Jose, CA, May 24, 2005; pp. 714-717.

\* cited by examiner

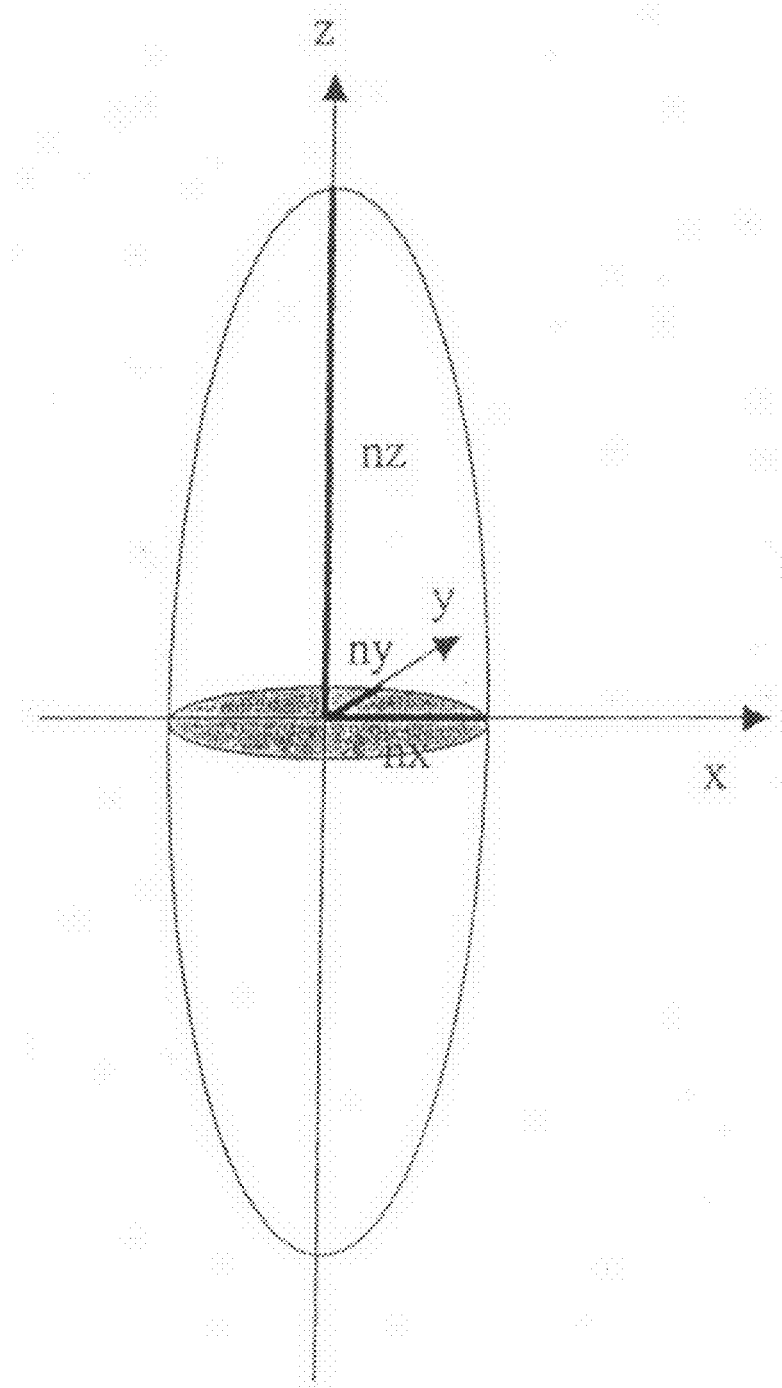

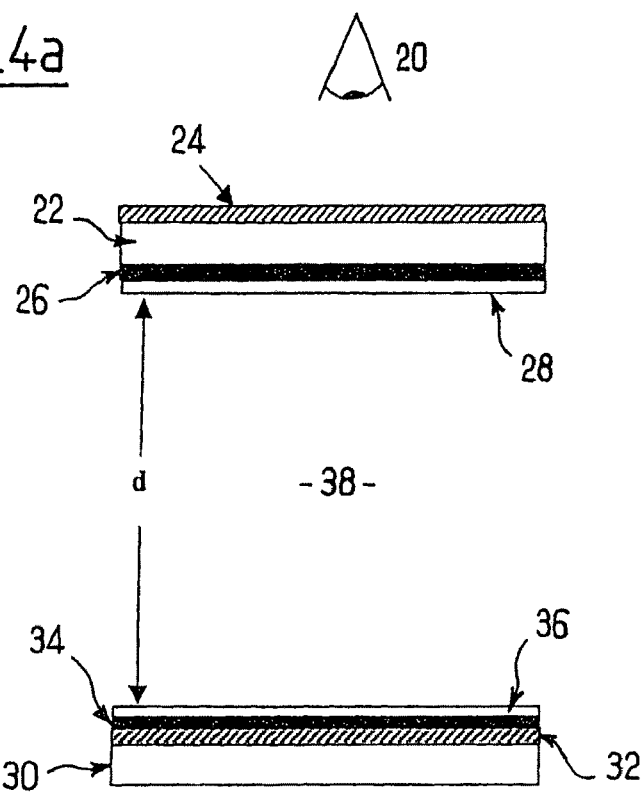
FIG_4a
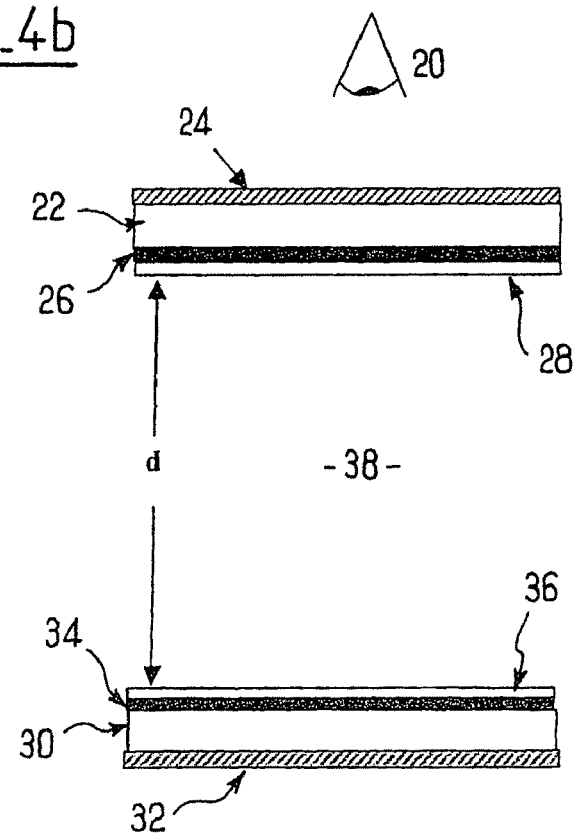
FIG_4b

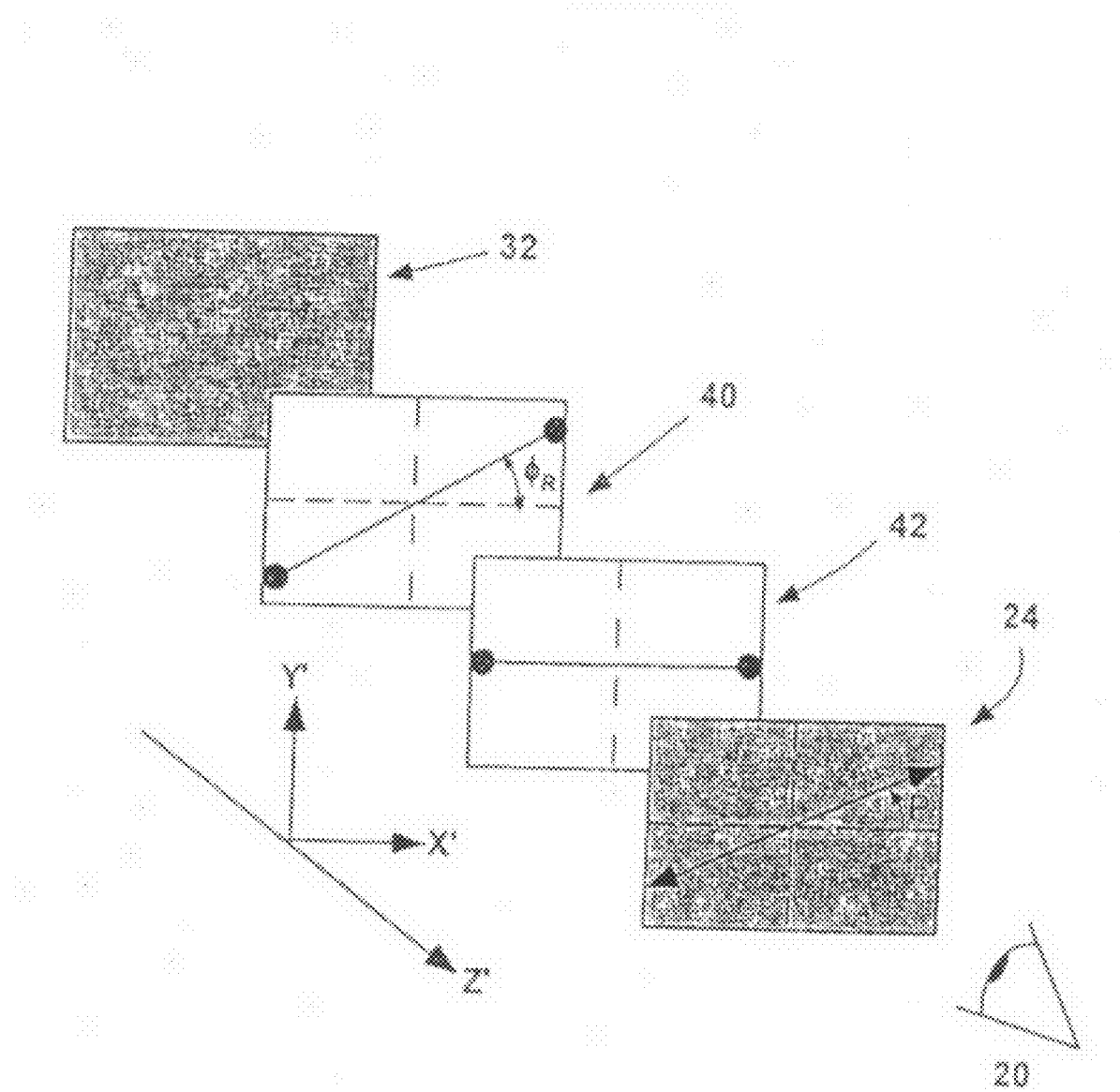

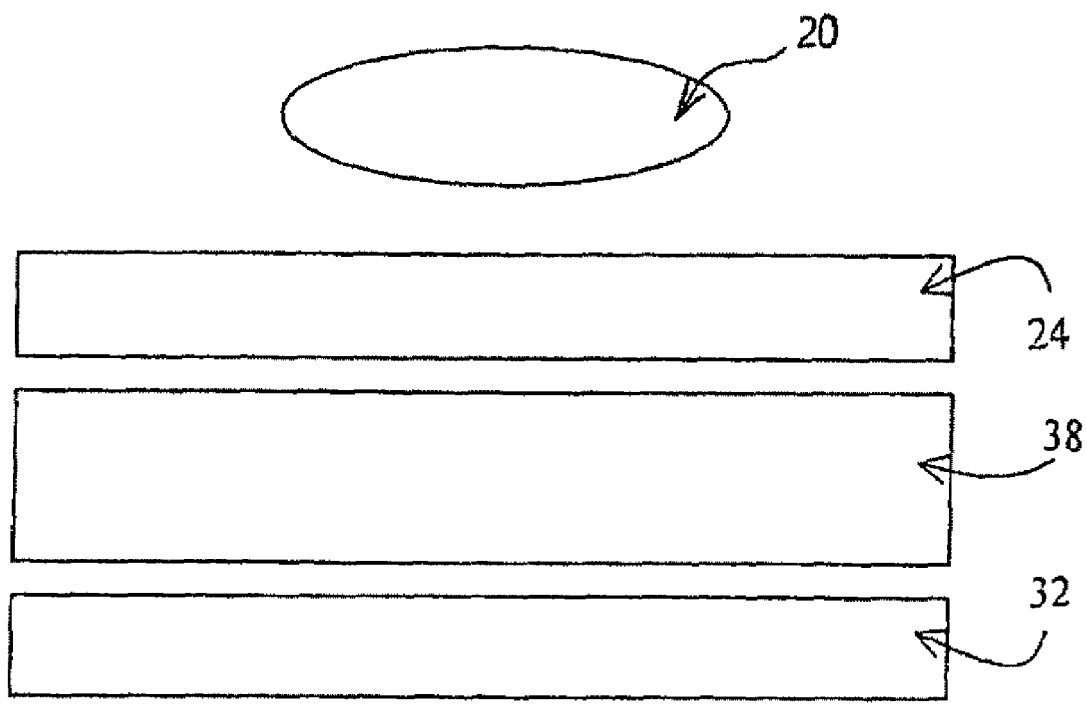

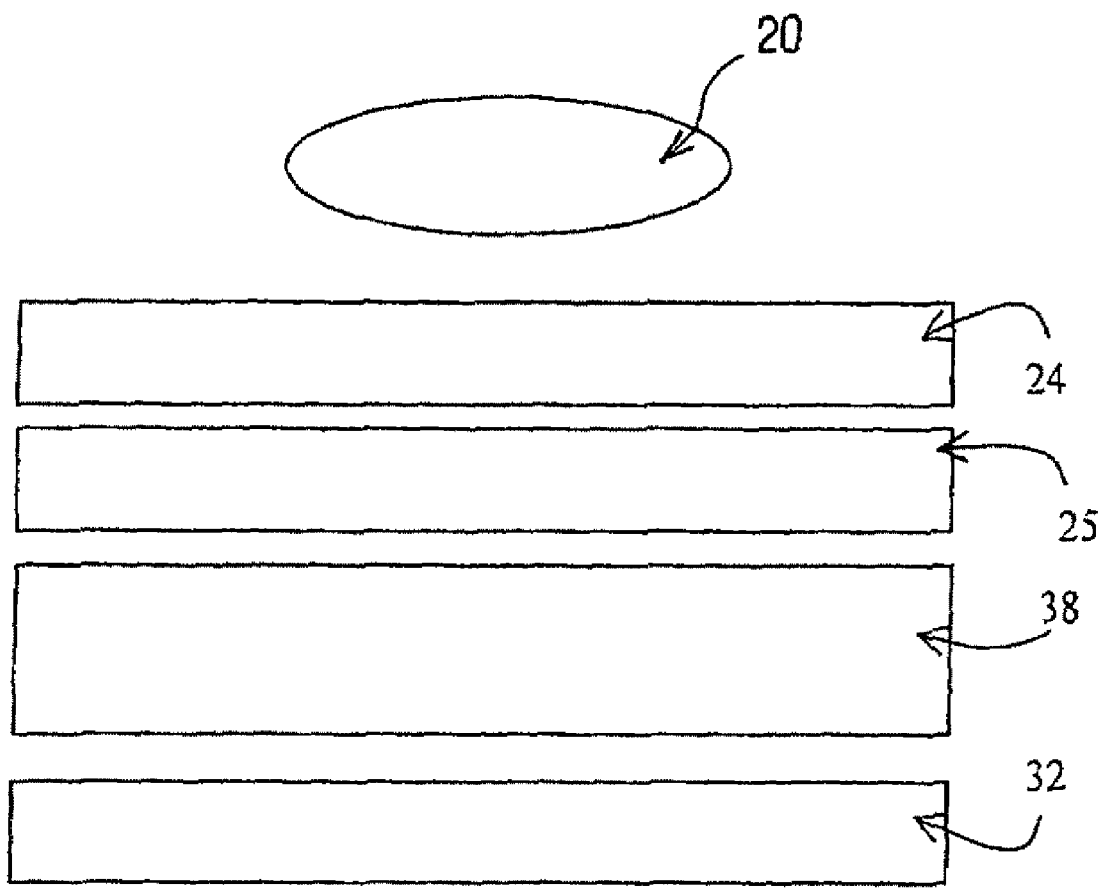
FIG_9

SINGLE-POLARIZER REFLECTIVE BISTABLE TWISTED NEMATIC (BTN) LIQUID CRYSTAL DISPLAY DEVICE

The present patent application is a non-provisional application of International Application No. PCT/EP2006/062203, filed May 10, 2006.

FIELD AND OBJECT OF THE INVENTION

The present invention concerns the field of liquid crystal displays (LCDs) and more specifically a method for improving the optical performance of single-polarizer reflective bistable twisted nematic (πBTN) liquid crystal displays when viewed at oblique angles.

BACKGROUND OF THE INVENTION

Single-Polarizer Reflective LCDs

Conventional LCDs used in liquid crystal television sets and desktop computer monitors are transmissive displays with polarizers on both sides of the LCD cell. A backlight provides the source of illumination. Such two-polarizer transmissive LCDs can be transformed into two-polarizer reflective LCDs simply by placing a reflector behind the rear polarizer. Ambient light from the front provides the illumination source. However, there are several problems associated with these two-polarizer reflective LCDs. One problem is the appearance of double-imaging when the display is observed obliquely. This is caused by parallax introduced by the thickness of the rear glass substrate causing the reflected image of the pixels to be displaced from the image formed by the pixels themselves. Double imaging becomes a serious problem for higher resolution reflective displays where the pixel dimensions are comparable to the thickness of the rear substrate plate. Parallax can be avoided if the reflector is placed inside the display cell, but then the rear polarizer would also have to be placed inside the cell on top of the reflector and this is not a practical process. But in a single-polarizer LCD no second, internal polarizer is present and the reflector can be easily placed inside the cell by making rear electrodes out of a reflective metal such as aluminum. Double imaging can thus be completely avoided in single-polarizer reflective LCDs.

Improved brightness is another advantage of single-polarizer reflective LCDs. Practical polarizing films absorb a certain amount of light even when the input light is polarized parallel to the polarizer's transmission axis. Since in a single polarizer reflective display the light passes through a polarizer two times instead of passing through a polarizer four times in a two-polarizer reflective display, the single-polarizer display will necessarily appear brighter. This improved brightness can be an enormous advantage when the display is viewed under conditions of low ambient light.

Finally, a conventional two-polarizer reflective design cannot be used if the rear substrate plate is opaque, such as a silicon chip. In this case the only option is to place the reflector inside the cell. Single-polarizer displays have therefore found broad applications in high resolution Liquid Crystal on Silicon (LCoS) displays used in some rear projection television sets and near-eye headset applications.

Viewing Angle Problem of LCDs

Nematic liquid crystal (LC) molecules form a uniaxial birefringent medium with the optic axis parallel to the director of the liquid crystal. Nearly all known nematic liquid crystals have positive optical anisotropy where the extraordinary refractive index is larger than the ordinary refractive index. The optical properties of LCDs are generally optimized for light passing perpendicularly to the cell substrates. For a light incident at an oblique angle θ, the birefringence of the liquid crystal will modify the state of light polarization in a different way than for light at normal incidence. This could cause, for example, an increased amount of light leakage in the dark state, degrading the contrast ratio at the oblique viewing angle and making the images look washed out. The color of the bright state of the display can also change depending of the oblique viewing angle, giving familiar images an unnatural appearance. The variation of the optical performance of LCDs with viewing angle is an intrinsic problem of LCDs because of the birefringent nature of liquid crystals.

Birefringent Layers

Much work has been done to improve the optical performance of LCDs at oblique viewing angles. This work has primarily focused on using external birefringent layers, known as compensation films, to cancel the retardation of the LCD in the dark state when viewed at oblique angles. A birefringent medium is a medium having anisotropy in refractive index. In the most general case the medium is biaxial and is fully described by the index ellipsoid (FIG. 1). Three different refractive indices ($n_x, n_y, n_z$) along the three axes (x,y,z) of the ellipsoid define the optical properties of the medium. By convention we choose z axis perpendicular to the glass substrate plane, and x and y axes inside the substrate plane (in planes axes).

When the biaxial media are fabricated, for example, by stretching plastic films, the z axis is perpendicular to the sheet and the x and y axes are in the plane of the sheet. If the two in-plane indices are equal, $n_x = n_y$, then the medium is uniaxial and the z axis is the optic axis which is perpendicular to the film plane. In this case the uniaxial film is called a C plate. If either one of the in-plane indices ($n_x$ or $n_y$) and the out-of-plane index $n_z$ are equal then the film is also uniaxial and the optic axis is parallel to the film plane. In this case the uniaxial film is called an A plate. Such C plate and A plates are illustrated in FIGS. 2a and 2b wherein uniaxial film plates are referenced 1.

A common way to characterize a biaxial medium is through the Nz parameter defined as $Nz = (n_x - n_z)/(n_x - n_y)$ with $n_x > n_y$. Classically, the axis corresponding to the larger in-plane index (for us $n_x$) is called slow axis and the axis corresponding to smaller in-plane index (for us $n_y$) is called fast axis. The choice $n_x > n_y$ is an arbitrary choice just to distinguish between the larger and the smaller in-plane index.

Table 1 summarizes the different kinds of birefringent media and their associated Nz values.

TABLE 1 relationship between Nz and type of birefringent medium

| Nz | $-\infty$ | | 0 | | 1 | | $+\infty$ |
|---|---|---|---|---|---|---|---|
| | $n_z > n_x = n_y$ | $n_z > n_x > n_y$ | $n_x = n_z > n_y$ | $n_x > n_z > n_y$ | $n_x > n_y = n_z$ | $n_x > n_y > n_z$ | $n_x = n_y > n_z$ |
| | C+ | Biaxial | A− | Biaxial | A+ | Biaxial | C− |

The optical retardation R for a uniaxial medium where, for example $n_x = n_y = n_o$, is defined as $R = (n_z - n_o) \cdot d$, where d is the thickness of the uniaxial film and no is the ordinary index of refraction. Optical retardation is generally given in units of nanometers, or nm. A biaxial film is characterized by two retardation values, for example (nx−ny)·d and (nx−nz)·d.

Uniaxial A plates and C plates can also be composed of uniformly aligned liquid crystal molecules. Most nematic liquid crystals are uniaxially positive and thus can form A+ or C+ plates depending upon whether the optic axis is oriented parallel or perpendicular to the substrate plane. Discotic liquid crystals are uniaxially negative and thus can form A− or C− plates depending upon whether the optic axis is oriented parallel or perpendicular to the substrate plane. These birefringent oriented liquid crystal layers could either be contained between two substrate plates or they could consist of polymerized liquid crystals forming a free-standing, oriented film of their own. Still other retardation films are known which can be generated by exposing certain types of photopolymers to polarized light which could either be located on the inner surfaces of the substrate plates containing the active liquid crystal material or on the outer surfaces of the substrate plates. Still other retardation films are known which can be deposited on the substrate surfaces through a coating process (Lazarev et al. 1991 SID Digest of Technical Papers p 571-3).

Polarizing films currently available in the market are made of an oriented anisotropically absorbing sheet laminated between two plastic carrier substrates.

Nearly all commercially available polarizers use Tri Acetyl Cellulose (TAC) as a carrier substrate which is known to be a film which is uniaxial or very slightly biaxial having a negative optical anisotropy (Han, Journal of the SID, 3/1,1995 p 15). FIG. 3 shows two TAC substrates 10 and 12 provided on either side of an absorbing layer 14. The optic axis of a TAC film is perpendicular to the plane of the layer, so it is a negative C plate, with typical retardation (nz−no)·d of −40 nm to −55 nm. This type of polarizer is coated with a pressure sensitive adhesive (PSA) and is intended to be laminated on the outside of the substrate plates containing the active liquid crystal material.

Other polarizing films are known which can be coated on inside of the substrate plates containing the liquid crystal material (Ohyama et al. 2004 SID Digest of Technical Papers p 1106-1109). In this case no TAC layer is present. If the polarizer is coated on the inside of the substrate plate it can be located either underneath the electrode or on top of the electrode.

Monostable TN Displays

The most commonly used liquid crystal display mode is the 90° Twisted Nematic (TN) mode. In the absence of an applied electric field the liquid crystal molecules are parallel to the substrate plane and adopt a 90° twisted structure which rotates the plane of polarized light by 90°. When an electric field is applied, the molecules tilt out of the substrate plane according to the field strength, and the layer untwists to a state which does not rotate the plane of polarized light. When such a layer is placed between two crossed polarizers, for example, the display transmission will vary according to the applied voltage. When the field is removed the liquid crystal layer returns to its original 90° twisted texture.

The TN display is an example of a monostable display, which means that if the drive signals are turned off, no image will be displayed and the screen will appear blank because the liquid crystal returns to its single, monostable texture. Monostable displays must be continuously updated in order to see the image, even if the image itself does not change. This is a disadvantage for displays designed for portable equipment since continuously updating the display requires a significant amount of power which puts undue strain on the battery lifetime.

The supertwisted nematic (STN) display is another type of a monostable TN liquid crystal display. It has a twist angle of approximately 240° in the absence of an electric field. Like the 90° TN display, the strength of an applied electric field controls the angle that the liquid crystal molecules tilt out of the substrate plane.

Compensating Monostable TN Displays to Improve Range of Oblique Viewing Angles

In the publication Han, Journal of the SID, Mar.1,1995 p 15 it was noted that the negative optical anisotropy present in the TAC layers of commercial polarizing films actually improved the viewing angle characteristics of the TN display. To further improve the viewing angle characteristics of the TN display Mori proposed to compensate the black, driven state of the display with compensation layers made of polymerized negative birefringent discotic liquid crystal molecules having a nonuniform, splayed optic axis orientation throughout the layer that mirrors the liquid crystal director orientation near the boundaries of the driven TN cell (Mori IDW '96 p 189 or Jpn. J. Appl. Phys. 36 1997 p 143).

STN displays are generally compensated with uniaxially stretched polymer films. The primary purpose of these birefringent films is to remove the intrinsic STN coloration and make it possible for the pixels to switch from black to white—a prerequisite if a full color display is to be realized using color mosaic filters. The compensation films also improve the range of viewing angles, but the range is never as wide as with the compensated TN displays.

Other Monostable Displays and Optical Compensation

Other LCD modes have recently being developed like OCB (Optically Compensated Birefringence) or VA (Vertically Aligned). For example OCB display can be compensated with biaxial film with Nz>1 and specific retardations adapted to the OCB LC mode (C. L Kuo at al, SID 94 p 927-930, see p 928 table 3). To calculate Nz in this publication, it is important to consider the greater index in the substrate plane in the Nz formula:

$$Nz=[n(\text{greater in-plane index})-nz]/[n(\text{greater in-plane index})-n(\text{smaller in-plane index})]$$

In this invention the convention is nx is the greater in plane index and ny is the smaller in plane index, nx>ny (arbitrary choice). In the cited publication, the greater, in plane index is called ny. Thus in the publication, to calculate Nz by applying our formula, it is necessary to change nx by ny and ny by nx. It can be seen that in the publication, the nz value is always smaller than nx and ny, meaning the Nz>1 case. Same case for the publication by Y. Yamaguchi et al (SID 93 p 277-280, table 1 and table 2). In this publication, nx is chosen greater than ny.

It is well known that each LC mode can be optically compensated by dedicated compensation film. Specific parameters of birefringent films have to be optimised for compensation of each LC mode: number and type of birefringent film (uniaxial C or A plate positive or negative, biaxial), retardation values in nm (one retardation value for uniaxial, two retardation values for biaxial), angular orientation of optical axis for uniaxial plates or index ellipsoid axis for biaxial plates. A lot of literature has been published concerning the optical compensation of LC modes, and the CIB class 1/13363 is exclusively dedicated to this topic.

Bistable TN Displays

Another class of nematic LCDs are those that exhibit bistable, multistable or metastable behavior. In this class, the liquid crystal layer can assume at least two distinct textures that are either stable or metastable in the absence of an applied electric field. To switch between the two textures, suitable electronic signals are applied to electrodes that are positioned on each side of the liquid crystal layer. Once a particular texture is created, it persists in the absence of an applied electric field thanks to its bistability. The ability of bistable LCDs to store images in the absence of an applied electric field means that the display does not need to be continuously updated at a high rate if the displayed information does not change. This dramatically reduces the power consumption of the display and makes bistable displays attractive for portable devices where battery lifetime is of paramount importance.

In bistable TN displays the two textures consist of uniformly twisted, substantially planar nematic structures, each having a different twist angle. The basic cell structure of a single-polarizer, reflective bistable twisted nematic (BTN) LCD is shown in FIG. 4a. The cell comprises a layer 38 of chiral nematic liquid crystal, having a uniform twist, between two substrate plates—a rear substrate 30 and a front substrate 22 which faces the viewer 20. Front and rear electrodes 26, 34 positioned on the substrates 22, 30 allow electrical command signals to be applied to the chiral nematic liquid crystal 38 situated between them. A reflector 32 is positioned between the liquid crystal layer 38 and the rear substrate 30. The reflector 32 can be positioned between the transparent electrode 34 and the rear substrate 30, but electrically isolated from the electrode 34. The reflector 32 could, for example, be a multilayer dielectric mirror. The reflector 32 could also be made out of a conducting, reflective material such as aluminum. The electrode 34 and the reflector 32 can be merged in this case. Either of the above designs would not have double-imaging since the reflector would be inside the cell. Alternatively, if the rear electrode 34 and rear substrate 30 are both made of transparent materials, then the reflector 32 could be placed external to the LC cell (FIG. 4b). Alignment layers 28, 36 deposited on the electrodes 26, 34 orient the liquid crystal molecules 38 at the two boundary surfaces to give the desired twist angles for the two bistable textures. A single polarizer 24 situated on the front substrate 22 makes it possible to obtain a bright optical state and a dark optical state, each state being associated with one or the other of the two bistable textures. The polarizer 24 is generally situated external to the LC cell, as shown in FIGS. 4a and 4b, but it could also be situated inside the LC cell. If the display were designed for color, then color filters (not shown) would also be present on the inside of one of the substrates 22, 30. On FIGS. 4a and 4b, the layer thickness of the chiral nematic liquid crystal or cell gap is referenced "d".

The optical parameters of a single-polarizer, reflective BTN liquid crystal display are (FIG. 5):
  the liquid crystal layer retardation $\Delta n \cdot d$ defined as the product of the liquid crystal birefringence $\Delta n$ and the cell gap d,
  the angle $\phi_F$ that the liquid crystal director 42 on the inner surface of the front substrate makes with the x'-axis. By convention we set the director parallel to the x'-axis, which makes $\phi_F=0$.
  the angle $\phi_R$ that the liquid crystal director 40 on the inner surface of the rear substrate makes with the x'-axis. Angles are defined as positive when the director is rotated away from the x' axis in a counterclockwise sense.
  the polarizer angle P that the absorption axis of the front polarizer 24 makes with the x' axis. Angles are defined as positive when the absorption axis is rotated away from the x' axis in a counterclockwise sense.

Two types of Bistable Twisted Nematic (BTN) displays have been developed that each have two uniformly twisted textures in the absence of an applied field. These two types are known as πBTN displays and 2πBTN displays. They will be described in further detail below.

πBTN Display Called BiNem Display

The πBTN display, also called the BiNem display, has been proposed by Dozov (U.S. Pat. No. 6,327,017). The two stable states of the BiNem display are uniformly twisted nematic textures which, for the case of strong azimuthal anchoring, differ in total twist angle by 180°, hence the name πBTN. Because finite anchoring energy, elasticity or slippage, the two stable states can differ in total twist angle by an angle slightly smaller than 180°, typically between 150° and 180°. Because the two textures are topologically inequivalent, a breaking of the anchoring on one of the surface alignment layers is necessary to switch from one texture to the other (see FIGS. 6a and 6b). This breaking of the anchoring in the BiNem display is obtained by applying an electric field perpendicular to the substrates. Kwok (U.S. Pat. No. 6,784,955) describes a πBTN embodiment where the two textures are switched by an electric field having two components, one parallel and one perpendicular to the substrates.

On FIG. 6a anchoring breaking of the LC molecules is illustrated on the side of a weak anchoring orientation layer 36, the other orientation layer 28 having strong anchoring properties. On the same FIG. 6a, the front transparent Indium-Tin Oxide (ITO) electrode is referenced as 26 and the rear electrode 34 is a reflective metallic material such as aluminum which also serves as the reflector. Another option is to have a transparent electrode 34 and a reflector 32 isolated electrically but both situated between the liquid crystal layer 38 and the rear substrate 30, as shown on FIG. 4a. Alternatively, if the rear electrode 34 and rear substrate 30 are both made of transparent materials, as shown on FIG. 4b, then the reflector 32 could be placed external to the LC cell (FIG. 6b).

The low twisted texture (twist $\phi_U$) is called the U texture and the high twisted texture (twist $\phi_T \approx \phi_U \pm \pi$) is called the T texture. In order to equalize the energy of the two textures, the d/p ratio is given by $d/p \approx 0.25 + \phi_U/2\pi$, where d is the liquid crystal layer thickness or cell gap and p is the intrinsic pitch of the chiral nematic liquid crystal.

Many optimized optical modes for single-polarizer, reflective πBTN displays having both high brightness and high contrast ratio for normal incidence viewing have been proposed by Kwok (US 2003/0076455 A1) and Osterman et al. (Eurodisplay 2002, p. 479-482). These modes have certain layer twist angles, polarizer angles and liquid crystal layer retardations which have been optimized for perpendicular viewing.

Intrinsic Viewing Angle Performance

One of Osterman's single-polarizer, reflective πBTN modes (called mode no. 1-1) is depicted by the optical stack shown in FIG. 7. The optical stack comprises a reflector 32, a liquid crystal layer 38 and a polarizer 24. The viewer 20 is positioned on the opposite side of the reflector with respect to the liquid crystal layer. The polarizer 24 can be either laminated onto the front LCD glass substrate or coated on the inside of the LC cell. The layer twist angles for the U and T textures are −5.7° and 174.3°. The 1-1 mode has a retardation $\Delta n \cdot d$ of 137.8 nm. There are two possible polarizer angles for mode 1-1: the one presented by Osterman and another one obtained by rotating the polarizer through an angle of 90°. These two polarizer configurations give the same optical performance when the display is viewed perpendicularly, but can give quite different optical performance when the display is viewed obliquely. Since the present invention deals with improving optical performance at oblique viewing, it is imperative to consider both polarizer orientations. Using the sign convention of FIG. 5 the two polarizer angles for Osterman's 1-1 mode are P=−41.3° and P=+48.7°.

The contrast ratio and color shift characteristics for oblique viewing of the display are conveniently represented on conoscopic figures which indicate the contrast ratio and color shift in the form of isolines over the viewing hemisphere. The enclosed figures are simulated using a state-of-the-art simulation software called LCD Master available from Shintech, Japan. For simplicity, the birefringence of the liquid crystal and the compensators is assumed to have no wavelength dispersion and an ideal polarizer and ideal reflector are assumed as well. In the conoscopic figures presented in the present patent the polar viewing angle of incidence is indicated by moving radially in the figure starting at the center for viewing the display straight-on and extending to the periphery for viewing the display at the near grazing polar angle of incidence of 80°. The azimuthal viewing direction is indicated by moving tangentially along the circular lines from 0° to 360°. These diagrams are routinely generated by state-of-the-art LCD simulation software and LCD optical characterization instruments. For contrast ratio, isolines of equal luminous contrast are plotted assuming an equal energy light source, which is an ideal white source having a constant intensity over the visible spectrum. The luminous contrast is defined as the luminous reflectance of the bright state divided by the luminous reflectance of the dark state. The luminous reflectance is the value of the reflectance which has been integrated over the spectral sensitivity curve of the human eye, otherwise known as the photopic reflectance. For color shift, isolines of equal chromaticity difference $\Delta C$ are plotted where the reference color is the normal incidence color. One unit of $\Delta C$ can be considered to be a just noticeable color difference $\Delta C$ is defined by:

$$\Delta C = \sqrt{(u^*_2 - u^*_1)^2 - (v^*_2 - v^*_1)^2},$$

where the subscript 1 refers to the u* and v* color coordinates at normal incidence and the subscript 2 refers to those coordinates at other oblique angles of incidence. u* and v* are defined by:

$$u^* = 13L^*(u' - u'_n)$$
$$v^* = 13L^*(v' - v'_n)$$
$$L^* = 116\left[\frac{Y}{Y_n}\right]^{\frac{1}{3}} - 16$$

where the subscript n refers to the value corresponding to nominally white light. As usual $$u' = \frac{4X}{X + 15Y + 3Z}$$

and $$v' = \frac{9Y}{X + 15Y + 3Z}$$

where X, Y and Z are the tristimulus values.

FIG. 8 shows conoscopic contrast ratio (8a) and conoscopic color shift (8b) diagrams for the example of the single polarizer, reflective configuration illustrated in FIG. 7 where P=−41.3°. On FIG. 8a iso-contrast ratio contours from center outward are: 70, 60, 50, 40, 30, 20 and 10. It is seen from FIG. 8a that a contrast ratio greater than 10:1 over the full 0°-360° azimuthal range is achieved for polar angles θ extending out to a maximum value of 49°. We call this angle θmax. For polar angles larger than θmax there are some azimuthal viewing angles where the contrast ratio is less that 10:1. On FIG. 8b the iso-color difference contours $\Delta C$ from center outward are: 2, 4, 6 and 8. In this diagram the maximum color shift, which we call $\Delta C$max, is 6.7. Of course the complete conoscopic figures give many more details, but much of the important information can be summarized by the two numbers θmax and $\Delta C$max. This notation will be used throughout the rest of the description of this invention.

This restricted range of viewing angles to achieve a 10:1 contrast ratio for the configuration illustrated in FIG. 7 is adequate, but leaves room for improvement. It would also be desirable to reduce the amount of color shift since a $\Delta C$max of 6.7 would be quite noticeable.

As mentioned previously, rotating the polarizer by 90° results in the same display performance for perpendicular viewing but different performance when viewed obliquely. Table 2 compares θmax and $\Delta C$max for these two polarizer configurations where, for this case, the performance is nearly identical.

TABLE 2 comparison of the oblique optical performance of mode 1-1 of the single-polarizer reflective πBTN display for the two different polarizer configurations.

| Config. No. | P angle | θmax | $\Delta C$max |
|---|---|---|---|
| #1 | −41.3 | 49° | 6.7 |
| #2 | +48.7 | 48° | 7.0 |

Influence of TAC Substrates

As explained earlier, commercially available polarizers have birefringent TAC carrier substrates on both sides (FIG. 3) However, only the TAC substrate 12 between the LC layer and the polarizer film 14 will influence the optical performance and needs to be considered.

FIG. 9 shows an optical stack, comprising a polarizer 24 with P=−41.3°, a TAC substrate 25 with a typical TAC retardation value of (nz−no)·d=−55 nm, a πBTN liquid crystal 38 with a retardation of $\Delta$n·d=137.8 nm, a U twist=−5.7° and a T twist=174.3° and a reflector 32. Table 3 presents θmax and $\Delta C$max for the stack of FIG. 9 as well as for the other polarizer angle of 48.7° for comparison. Again, the performance is nearly identical. However in comparing table 3 with table 2 for the intrinsic πBTN display it is seen that the TAC layer significantly worsens the oblique viewing performance by dramatically narrowing θmax and increasing the maximum color shift $\Delta C$max.

TABLE 3 comparison of the oblique optical performance of mode 1-1 of the single-polarizer reflective πBTN display with one TAC layer for the two different polarizer configurations.

| Config. No. | P angle | θmax | $\Delta C$max |
|---|---|---|---|
| #1 | −41.3 | 38° | 18.6 |
| #2 | +48.7 | 38° | 19.1 |

FIG. 10 shows the simulated conoscopic figures corresponding to the stack example of FIG. 9. Comparing with FIG. 8 for the intrinsic πBTN is it seen in more detail how the TAC layer significantly narrows the display viewing cone and increases the color shift. This is quite the opposite behavior compared with conventional TN displays (Han, Journal of the SID, 3/1, 1995 p 15) where the TAC films actually improve the viewing angle characteristics.

2πBTN Display Called Berreman Display

The 2πBTN display was first introduced by Berreman (U.S. Pat. No. 4,239,345) and later by Tanaka (U.S. Pat. No. 5,900,852). The twist angle of the initial texture is $\phi+\pi$, and after a reset pulse, two planar metastable textures can be obtained having respectively $\phi$ and $\phi+2\pi$ twist for the case of strong azimuthal anchoring of the director at the substrate surfaces. The total twist angles of the two metastable textures thus differ by $2\pi$ (see FIG. 11). Switching between the two metastable textures is accomplished by applying an electric field perpendicular to the plane of the substrates. From various studies, it is known that the d/p ratio to achieve bistability in a 2πBTN display is given by $d/p \approx 0.5+\phi/2\pi$.

Intrinsic Viewing Angle Performance

Optimized optical modes for single polarizer, reflective 2πBTN displays having both high brightness and high contrast ratio for normal incidence viewing have been proposed by Tang et al. *J. Appl. Phys.* 87, 632-637 (2000) and Guo et al., *Applied Optics* 42(19) 3853-3863 (2003). One of these modes, which Guo refers to as mode 1, is illustrated on FIG. 12.

FIG. 12 shows a stack including a polarizer 24 with P=24.24° and a 2πBTN liquid crystal layer 38 with retardation $\Delta n \cdot d$=310.8 nm and twist angles of −67.2° and +292.8° and a reflector 32.

Table 4 presents θmax and ΔCmax for the stack of FIG. 12 as well as for the other polarizer angle of −65.76° where the polarizer has been rotated by 90°. Configuration 1 with the 24.24° polarizer angle gives the best performance of the two, but poorer performance in comparison with the intrinsic πBTN performance given table 2. θmax is narrower for the 2πBTN layer (43° vs. 49°) and ΔCmax is much larger (32.9 vs. 6.7).

TABLE 4 comparison of the oblique optical performance of mode 1 of Guo's single-polarizer reflective 2πBTN display for the two different polarizer configurations.

| Config. No. | P angle | θmax | ΔCmax |
| --- | --- | --- | --- |
| #1 | 24.24° | 43° | 32.9 |
| #2 | −65.76° | 32° | 35.0 |

The optical performance of configuration 1 is presented in FIG. 13 where it is seen that the optical performance of Guo's 2πBTN mode 1 is inferior to the corresponding intrinsic πBTN case shown in FIG. 8. Furthermore, the contrast ratio for perpendicular viewing is only 33 for mode 1 of the 2πBTN display whereas it is 72 for mode 1-1 of the πBTN display.

Influence of TAC Film

Adding a TAC layer to the mode 1 2πBTN display further worsens its oblique viewing performance. FIG. 14 shows a 2πBTN optical stack comprising a reflector 32, a 2πBTN liquid crystal layer 38 with retardation $\Delta n \cdot d$=310.8 nm and twist angles of −67.2° and +292.8°, a −55 nm TAC layer 25 and a polarizer 24 with P 24.24°. The viewer 20 is positioned on the opposite side of the reflector with respect to the liquid crystal layer 38.

Table 5 presents θmax and ΔCmax for the stack of FIG. 14. Configuration 1 with the 24.24° polarizer angle gives the best performance of the two.

TABLE 5 comparison of the oblique optical performance of mode 1 of Guo's single-polarizer reflective 2πBTN display with one TAC layer for the two different polarizer configurations.

| Config. No. | P angle | θmax | ΔCmax |
| --- | --- | --- | --- |
| #1 | 24.24° | 38° | 37.9 |
| #2 | −65.76° | 31° | 39.2 |

The optical performance of configuration 1 is presented in FIG. 15.

Optical Compensation of BTN Displays

Osterman (IDW '02, p 101-103) proposed placing a simple uniaxial quarter-wave retardation film (in plane (x,y) retardation equal λ/4, no out of plane (x,z) retardation because uniaxial) with optical axis making an angle of 45° with respect to the liquid crystal director situated on the viewer side of the device, either inside or outside a reflective πBTN display. This birefringent film is an exact quarter wave plate, which transforms linear polarization into circular one, because of retardation value λ/4 combined with angular positioning between optical axis and entrance polarizer of 45°. The best transformation is obtained when the retardation λ/4 is taken with green light (maximum eye sensitivity), in this case λ=550 nm. The object of Osterman's work was to optimize a single-polarizer reflective πBTN display for high contrast ratio and high brightness at normal incidence viewing. No attempt was made to optimize the retarder for high contrast ratio or reduced color shift at oblique viewing angles.

The principle of optical compensation of 2πBTN LC mode is suggested in patent EP 1170624 from Rolic. This patent is related to domain stabilized 2πBTN with specific patterned alignment layer. In §[0067], it is explained that the invention can be combined with "optical compensation layers" which can be "liquid crystalline thin films (uniaxial or twisted), stretched polymer films or of combinations of such films", "to improve brightness and/or contrast". Nothing more is described concerning the said compensation film, the sentence has a very general purpose and is obvious, because it is well known that any LC mode, including 2πBTN, can be optically improved by the use of compensation film. Moreover, this patent is related to a 2πBTN device comprising two polarizers, as it is said in the abstract.

As we previously said, single-polarizer reflective BTN displays with conventional birefringent retarders are known, but the retarders have not been optimized with the intent of improving the viewing angle. Kwok, for example, (Journal of Applied Optics vol. 88 No. 4 p 1718) published adding a quarter wave positive A plate to the reflector side of a 2πBTN display cell so that it would operate with high contrast. Similarly, Guo (Applied Optics vol. 42 No. 19, 2003, p 3853) proposed adding a plurality of half-wave and full-wave plates to the observer side of a 2πBTN display cell to obtain a high contrast, single-polarizer reflective display. The Guo birefringent film, which can be waveplate (retardation=λ) or half waveplate (retardation=λ/2), are, like for Ostermann case, defined with λ in the green area. The half wave has the function to rotate a linear polarization, and the best mode is when the half wave plate is defined with green light. So Guo uses birefringent film with retardation 550 nm and 275 nm (see p 3856).

The goal of these compensations was to improve the contrast ratio and reflectivity for observation at normal incidence. No attempt was made to optimize for high contrast ratio or reduced color shift at oblique viewing angles. Guo only shows that the viewing-angle properties of his compensation scheme designed for normal incidence remains almost unchanged compared to the case without compensation for one case, and clearly explain that the viewing angle performance is "slightly narrower for compensated mode" (see p 3860). So the skilled person has no incitation to consider this document to improve viewing angle performance at oblique incidence of 2πBTN displays.

U.S. Pat. No. 6,765,640 also calculates a retarder optimized for reflective 2πBTN display at normal incidence. Like in the other publications, half and quarter wave plates are considered, also defined with green light: the used half wave plate is equal to 270 nm (540 nm/2; column 7) and the quarter wave plate is equal to 132.5 nm (530/4; column 8). Optical performances are only given at normal incidence.

SUMMARY OF THE INVENTION

The object of the present invention is to obtain a single-polarizer reflective πBTN liquid crystal display with high contrast ratio and minimal color shift over a wide range of oblique viewing angles.

After long analysis, the inventors have determined that this object may be achieved by the addition of one or more special compensation layers.

As shown in FIGS. 8, 10, 13 and 15 and in tables 2, 3, 4 and 5, the range of viewing angles which have a high contrast and minimal color shift is rather limited for the single-polarizer reflective BTN embodiments. In fact, unlike the monostable TN display, the acceptable viewing angle range is further degraded by the TAC substrates present on commercial polarizers. The planar, uniformly twisted bistable textures of BTN displays are quite different from the texture of the driven TN state, and therefore have quite different optical properties for obliquely incident light. For this reason birefringent compensation layers developed to improve contrast ratio and reduce color shift at oblique viewing angles for TN displays would not be suitable for use with BTN displays.

The present invention proposes to improve the off-axis optical performance of single-polarizer reflective πBTN displays by positioning at least one new compensation layer between the polarizer and the reflector.

More precisely the present invention proposes a single-polarizer reflective bistable twisted nematic (πBTN) liquid crystal display device comprising a liquid crystal layer of thickness d, birefringence $\Delta n$ and retardation $\Delta n d$, said liquid crystal layer being situated between two substrates and between a polarizer and a reflector, said liquid crystal layer in the absence of an applied electric field having two stable uniformly twisted textures, the twists of the two stable textures differing by an angle being equal mainly to 180°, and at least one compensation layer positioned between said polarizer and said reflector, said compensation layer being composed of at least one birefringent film, said birefringent film having an optical anisotropy defined by three characteristic refractive indices nx, ny, nz, along three corresponding axis x, y, z of index ellipsoid, x and y being situated inside the substrates plane, nx and ny being called in plane indices, with $nx \geq ny$, x being called slow axis, and z being perpendicular to the substrates plane with biaxiality parameter Nz equal to (nx−nz)/(nx−ny), characterized in that Nz lies between −∞ and ½ so that under oblique viewing the retardation of the stable texture corresponding to the dark state is compensated to improve the contrast ratio and simultaneously the retardation of the stable texture corresponding to the bright state is modified to decrease the color shift.

In the present specification, "stable" is used to define textures which are considered as definitively stable in the absence of an applied electric field, while "metastable" is used to define textures which may change after a long time, in the absence of an applied electric field.

Each retarder or birefringent film is thus either a uniaxial positive C plate (nz>nx=ny with Nz=−∞), a uniaxial negative A plate (nx=nz>ny with Nz=0) or a biaxial plate having either Nz<0 or 0<Nz<½.

Various embodiments of the invention are proposed. In accordance with the present invention, the compensation layer could consist of a single retarder of the desired retardation or it could consist of a plurality of retarders whose total retardation when added together equals the desired retardation. The retarders composing the compensation layer could also be of different types, such as for example a combination of an A+ plate and a C+ plate.

According to alternative features of the invention:
the device comprises a plurality of compensation layers.
a rear electrode is a reflective metallic material which also serves as the reflector.
switching between the two textures is obtained by applying an electric field having at least one component perpendicular to the plane of the liquid crystal cell substrates.
the twists of the two stable textures differing by an angle being equal mainly to π is between 150° and 180°.
the birefringent film is constructed by stretching plastic films.
the birefringent film is constructed with polymerized liquid crystal molecules.
the birefringent film is constructed by exposing photopolymers to polarized light.
the birefringent film is deposited on the substrate surfaces through a coating process.
the birefringent film is part of the polarizer.
the d/p ratio is $d/p \approx 0.25 + \phi/2\pi$, $\phi$ being the twist of the lower twisted texture.
the liquid crystal layer retardation is equal to $\lambda/4$, $\lambda$ being a wavelength of the visible spectrum (350 to 700 nm), meaning a layer retardation between 90 nm and 175 nm.

The present invention relates also to a process of manufacturing a bistable twisted nematic (πBTN) liquid crystal display device, wherein said process comprising the steps of providing a liquid crystal layer of thickness d, birefringence $\Delta n$ and retardation $\Delta n d$, situated between two substrates and between a polarizer and a reflector, said liquid crystal layer in the absence of an applied electric field having two stable uniformly twisted textures, the twists of the two stable textures differing by an angle being equal mainly to 180°, and providing at least one compensation layer positioned between said polarizer and said reflector, said compensation layer being composed of at least one birefringent film or retarder, said birefringent film having an optical anisotropy defined by three characteristic refractive indices nx, ny, nz, along three corresponding axis x, y, z of index ellipsoid, x and y being situated inside the substrates plane, nx and ny being called in plane indices, with $nx \geq ny$, x being called slow axis, and z being perpendicular to the substrates plane with biaxiality parameter Nz equal to (nx−nz)/(nx−ny), said process being characterized in that Nz lies between −∞ and ½ so that under oblique viewing the retardation of the stable texture corresponding to the dark state is compensated to improve the contrast ratio and simultaneously the retardation of the stable texture corresponding to the bright state is modified to decrease the color shift.

Other features and advantages of the present invention are disclosed in the following detailed description as well on the enclosed drawings.

BRIEF DESCRIPTION OF THE DRAWINGS

FIG. 1 illustrates the refractive index ellipsoid of a biaxial medium according to the state of the art.

FIG. 4a illustrates a single-polarizer reflective πBTN cell structure according to the state of the art and FIG. 4b illustrates a single-polarizer reflective πBTN cell structure according to another embodiment of the state of the art.

FIG. 5 illustrates the definition of x'y'z' coordinate system and main optical parameters of a single-polarizer reflective πBTN cell structure according to the state of the art.

FIG. 7 illustrates an example of an optical stack for a single-polarizer reflective πBTN display according to the state of the art.

FIG. 8 illustrates optical performance of single-polarizer reflective πBTN display according to the state of the art, shown in FIG. 7. More precisely, FIG. 8a illustrates an iso-contrast figure with iso-contrast ratio contours from center outward of 70, 60, 50, 40, 30, 20 and 10, while

FIG. 9 illustrates an example of an optical stack for a single-polarizer reflective πBTN display according to the state of the art, taking into account the TAC substrate of commercially available polarizers FIG. 10 illustrates optical performance of single-polarizer reflective πBTN configuration according to the state of the art, including the TAC polarizer substrate as illustrated in FIG. 9. More precisely, FIG. 10a illustrates an iso-contrast figure with iso-contrast ratio contours from center outward of 70, 60, 50, 40, 30, 20 and 10, while

FIG. 13 illustrates optical performance of a single-polarizer reflective 2πBTN transmissive configuration according to the state of the art, illustrated in FIG. 12. More precisely, FIG. 13a illustrates an iso-contrast figure with iso-contrast ratio contours from center outward of 30, 20 and 10, while

FIG. 15 illustrates optical performance of a single-polarizer reflective 2πBTN configuration according to the state of the art, including the TAC polarizer substrate illustrated in FIG. 14. More precisely, FIG. 15a illustrates an iso-contrast figure with iso-contrast ratio contours from center outward of 30, 20 and 10, while

FIG. 20 illustrates optical performance of compensated single-polarizer πBTN reflective configuration of the invention using a 65 nm C+ retarder and a polarizer without a TAC substrate as described in table 7. More precisely, FIG. 20a illustrates a conoscopic figure with iso-contrast ratio contours from center outward of 70, 60, 50, 40, 30, 20 and 10, while

FIG. 21 illustrates optical performance of compensated single-polarizer πBTN reflective configuration of the invention using a 120 nm C+ retarder and including a TAC polarizer substrate as described in table 9. More precisely, FIG. 20a illustrates a conoscopic figure with iso-contrast ratio contours from center outward of 70, 60, 50, 40, 30, 20 and 10, while FIG. 20b illustrates color shift conoscopic figure having a maximum value ΔCmax of 0.4.

FIG. 21a illustrates an iso-contrast figure with iso-contrast ratio contours from center outward of 70, 60, 50, 40, 30, 20 and 10, while

FIG. 23 illustrates optical performance of compensated single-polarizer πBTN reflective configuration of the invention using a biaxial retarder with Nz=−5 and including a TAC polarizer substrate as described in table 13. More precisely, FIG. 23a illustrates a conoscopic figure with iso-contrast ratio contours from center outward of 70, 60, 50, 40, 30, 20 and 10, while

FIG. 24 illustrates optical performance of compensated single-polarizer πBTN reflective configuration of the invention using a biaxial retarder with Nz=0 and including a TAC polarizer substrate as described in table 15. More precisely, FIG. 24a illustrates a conoscopic figure with iso-contrast ratio contours from center outward of 70, 60, 50, 40, 30, 20 and 10, while

FIG. 25 illustrates optical performance of compensated single-polarizer πBTN reflective configuration of the invention using a biaxial retarder with Nz=½ and including a TAC polarizer substrate as described in table 17. More precisely, FIG. 25a illustrates a conoscopic figure with iso-contrast ratio contours from center outward of 70, 60, 50, 40, 30, 20 and 10, while

FIG. 26 illustrates optical performance of compensated single-polarizer πBTN reflective configuration of the invention using a biaxial retarder with Nz=1 and including a TAC polarizer substrate as described in table 19. More precisely, FIG. 26a illustrates a conoscopic figure with iso-contrast ratio contours from center outward of 70, 60, 50, 40, 30, 20 and 10, while

FIG. 27 illustrates optical performance of compensated single-polarizer πBTN reflective configuration of the invention using compensator consisting of positive A plate on top of a positive C plate that is located between the polarizer and the πBTN layer as described in table 21. More precisely, FIG. 27a illustrates a conoscopic figure with iso-contrast ratio contours from center outward of 70, 60, 50, 40, 30, 20 and 10, while

FIG. 28 illustrates optical performance of compensated single-polarizer πBTN reflective configuration of the invention using compensator consisting of positive C plate on top of a positive A plate that is located between the polarizer and the πBTN layer as described in table 23. More precisely, FIG. 28a illustrates a conoscopic figure with iso-contrast ratio contours from center outward of 70, 60, 50, 40, 30, 20 and 10, while

DESCRIPTION OF THE EMBODIMENTS

Figure 2A:
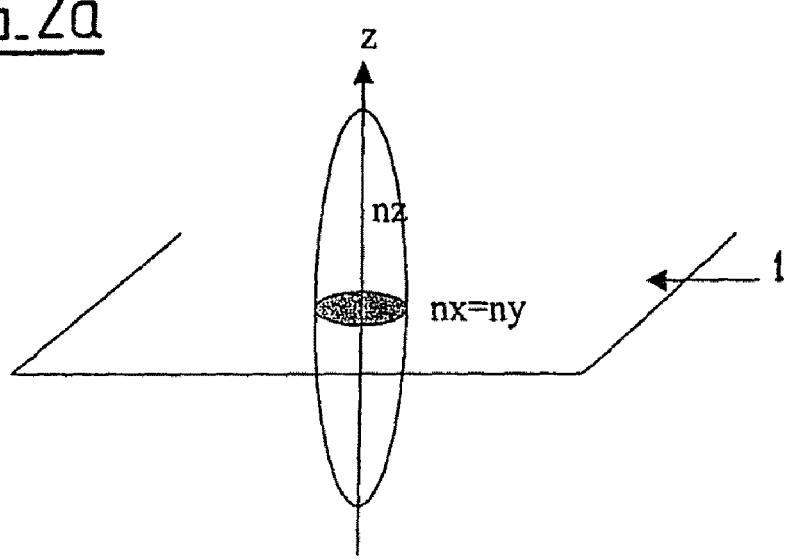
FIG. 2a illustrates a C+ plate uniaxial film according to the state of the art and FIG. 2b illustrates a A+ plate uniaxial film according to the state of the art.
Figure 2B:
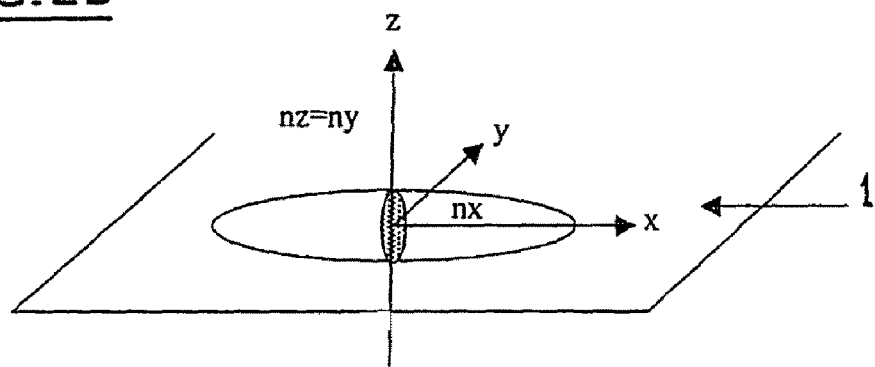
Figure 3:
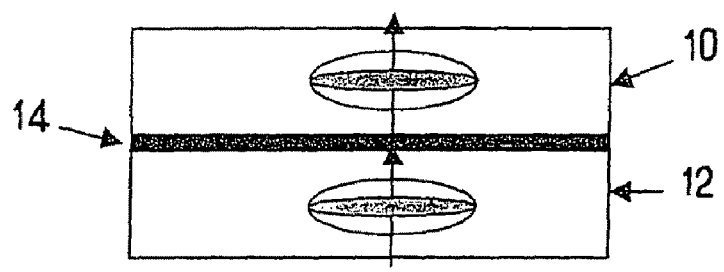
FIG. 3 illustrates the architecture of commercially available polarizers according to the state of the art.
Figure 6A:
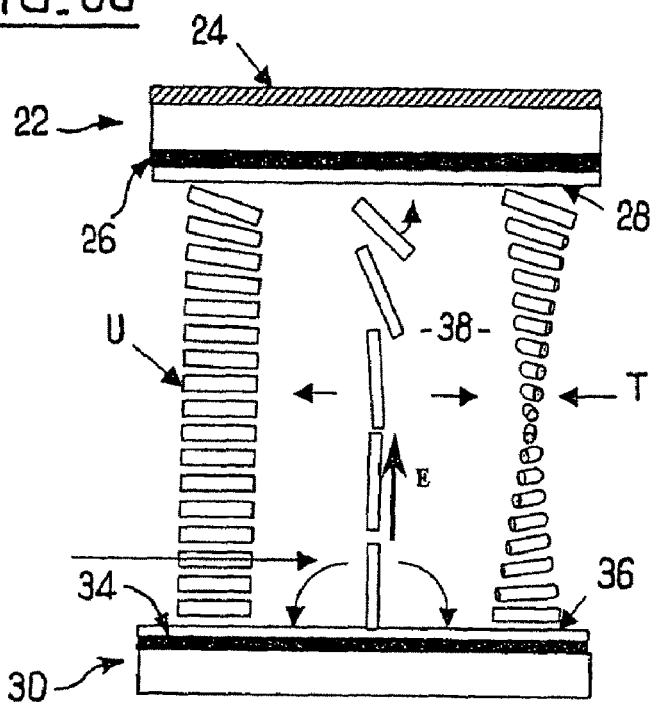
FIG. 6a illustrates the principle of a single-polarizer reflective πBTN display according to the state of the art and FIG. 6b illustrates the principle of a single-polarizer reflective πBTN display according to another embodiment of the state of the art.
Figure 6B:
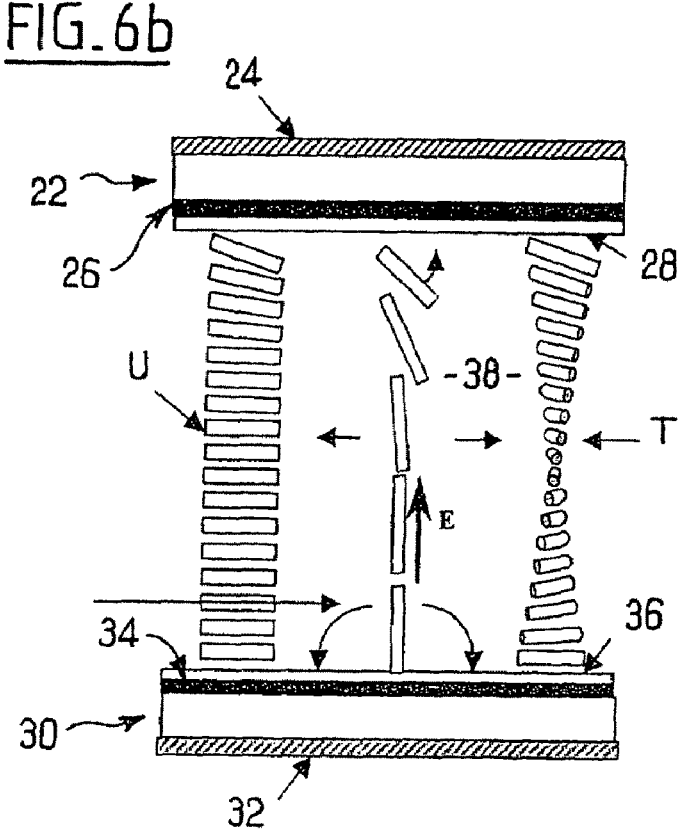

In a preferred embodiment of the present invention, the compensation layer 110 is situated on the viewer side of the display with respect to the liquid crystal layer 150. An example of a first variant of this first embodiment illustrated in FIG. 16, comprises a stack including a polarizer 100, a compensation layer 110, a transparent front substrate 120 (e.g. glass or plastic), a πBTN liquid crystal layer 150, a reflector 200 and a rear substrate 180. It is preferred that the reflector 200 be inside the cell, as shown, in order to avoid double imaging caused by parallax effects when the display is viewed obliquely. The reflector 200 could also be positioned external to the rear substrate 180 if the rear substrate 180 is transparent. For the purpose of clarity other cell components such as the orientation layers, transparent electrodes, color filters, spacers and sealants have been left out of the drawing.

Figure 17:
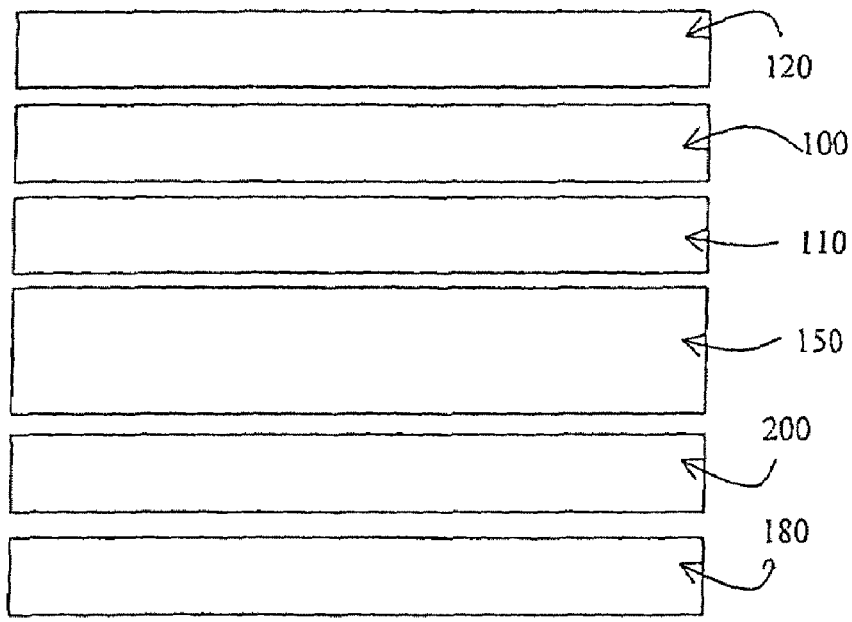
FIG. 17 illustrates another variant of the first embodiment of the present invention.
Figure 18:
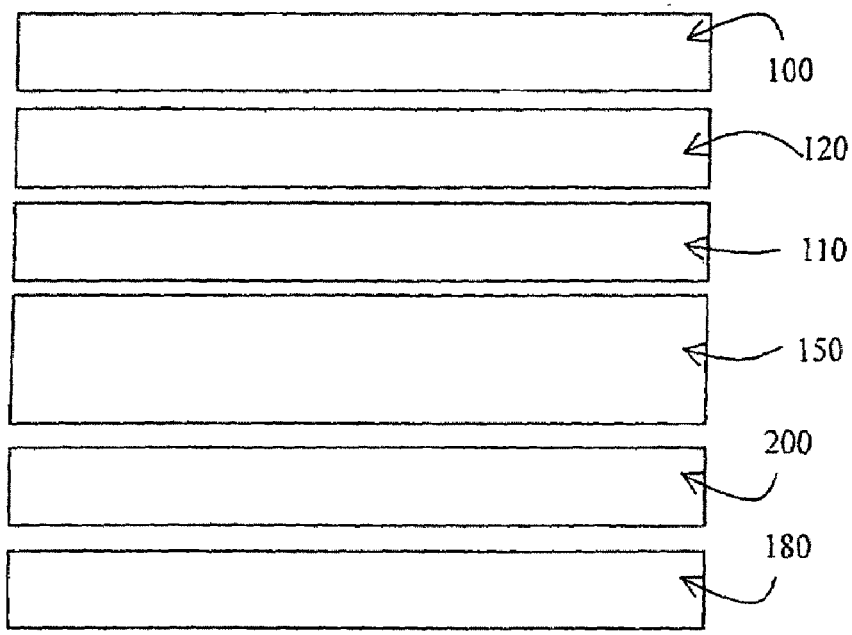
FIG. 18 illustrates another variant of the first embodiment of the present invention.

In another variant of this first embodiment the compensation layer 110 and the polarizer 100 can be situated inside the cell (variant illustrated on FIG. 17) or the compensation layer 110 can be situated inside the cell and the polarizer 100 outside the cell (variant illustrated on FIG. 18).

Figure 19:
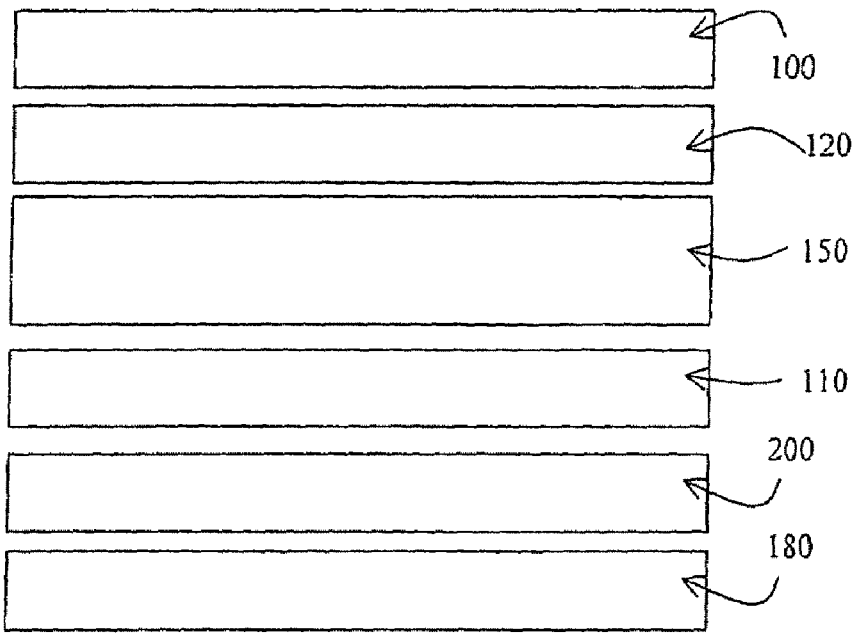
FIG. 19 illustrates an example of a second embodiment of the present invention.

In yet another embodiment the compensation layer 110 can also be positioned on the reflector side of the πBTN liquid crystal layer. FIG. 19 shows an example of this embodiment where the compensation layer 110 is inside the cell on top of the reflector 200 which is also inside the cell. Of course both the compensator 110 and reflector 200 can be external to the rear substrate 180 or the compensator 110 can be inside the cell on top of the rear substrate 180 and the reflector 200 could be external to the rear substrate 180.

Of course other combinations of the variant embodiments described in connection with FIGS. 16, 17, 18 and 19 are also possible. In particular, in another embodiment, the device may comprise a compensation layer on each side of the πBTN layer.

The optical stack illustrated on FIG. 17 comprises a transparent substrate 120, a polarizer 100, a compensation layer 110, a πBTN liquid crystal layer 150, a reflector 200 and a rear substrate 180.

The optical stack illustrated on FIG. 18 comprises a polarizer 100, a transparent substrate 120, a compensation layer 110, a πBTN liquid crystal layer 150, a reflector 200 and a rear substrate 180.

The optical stack illustrated on FIG. 19 comprises a polarizer 100, a transparent substrate 120, a πBTN liquid crystal layer 150, a compensation layer 110, reflector 200 and a rear substrate 180.

The compensator layer 110, provided according to the present invention, being composed of at least one retarder characterized by $-\infty \leq Nz \leq \frac{1}{2}$, greatly improves the contrast ratio of the display when viewed at oblique angles and decreases the observed color shift with viewing angle for both intrinsic πBTN displays and πBTN displays that have TAC layers on the polarizer substrate.

DETAILED DESCRIPTION OF EXAMPLES IN ACCORDANCE WITH THE INVENTION

Example 1

C+ Compensation Layer Between Polarizer with No TAC Substrate and πBTN Liquid Crystal Layer For this example the polarizer has no birefringent TAC substrate. This example could correspond to any of the embodiments described in connection with FIGS. 16-18 but is particularly suited for the embodiment of FIG. 17 where the polarizer and compensation layer are located between the transparent substrate 120 and the πBTN liquid crystal layer 150. If the polarizer were deposited by a coating process, for example, a TAC substrate layer would not be present. For this configuration, the polarizer can be oriented either at −41.3° or at 48.7°. The optical performance of these two configurations are simulated, finding an optimum value for the C+ compensator, and the results are given in the table 6 where it is seen that configuration #1 gives a slightly wider viewing cone and slightly less color shift. The stack corresponding to configuration #1 is explicitly presented in table 7.

TABLE 6 the oblique optical performance of mode 1-1 of the single-polarizer reflective πBTN display with an optimized C+ retarder between a polarizer without a TAC substrate and the πBTN liquid crystal layer.

| Config. No. | P angle | Positive C $(n_z - n_o) \cdot d$ | ΔCmax | θmax |
|---|---|---|---|---|
| #1 | −41.3 | 65 nm | 0.6 | 61° |
| #2 | 48.7° | 60 nm | 1.0 | 59° |

TABLE 7 configuration #1 of πBTN optical compensation with an optimized C+ uniaxial retarder between the polarizer without a TAC substrate and the πBTN liquid crystal layer.

Observer
Polarizer P = −41.3°
+65 nm C+ retarder
πBTN LC layer with Δnd = 137.8 nm
U twist = −5.7°, T twist = 174.3°
Reflector The compensation layer of this embodiment is composed of a positive uniaxial retarder with optic axis perpendicular to the substrates (C+), having a retardation $(n_z - n_o) \cdot d$ 65 nm.

Figure 20A:
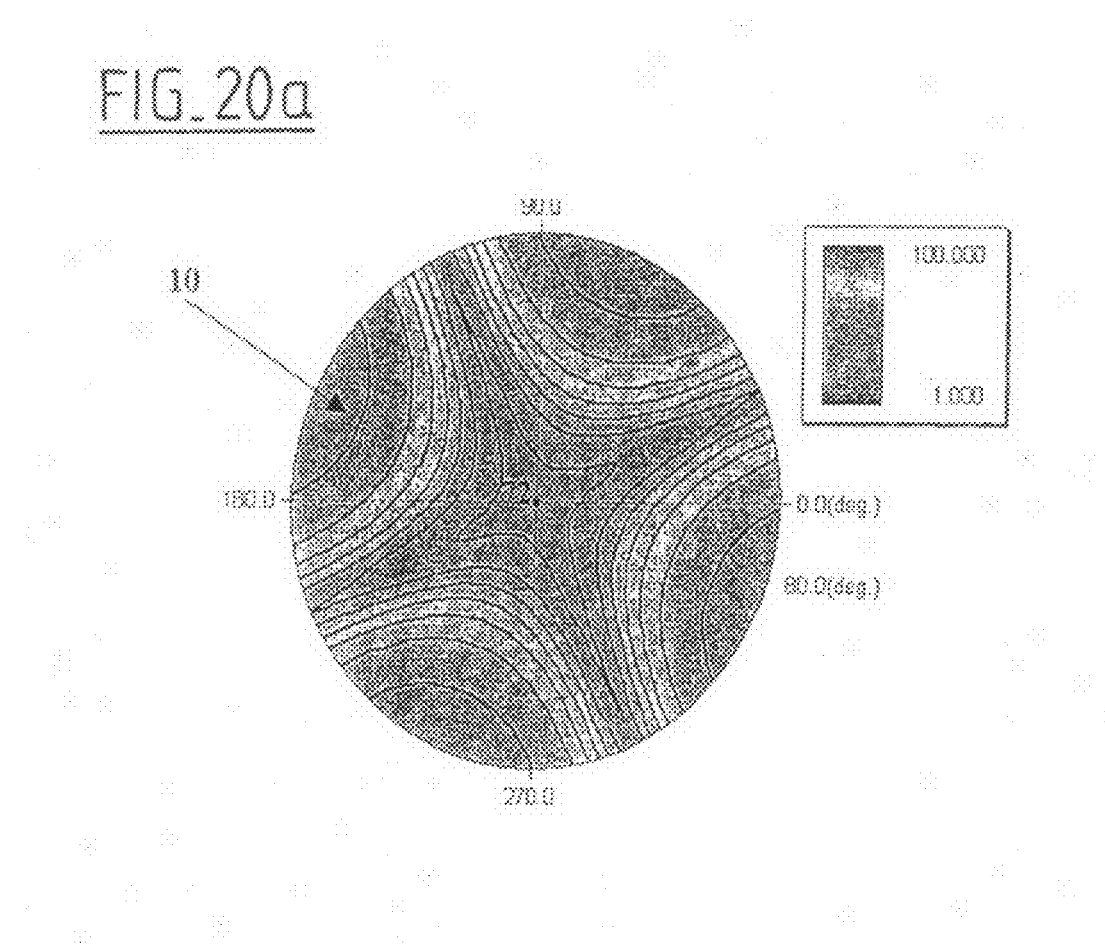
Figure 20B:
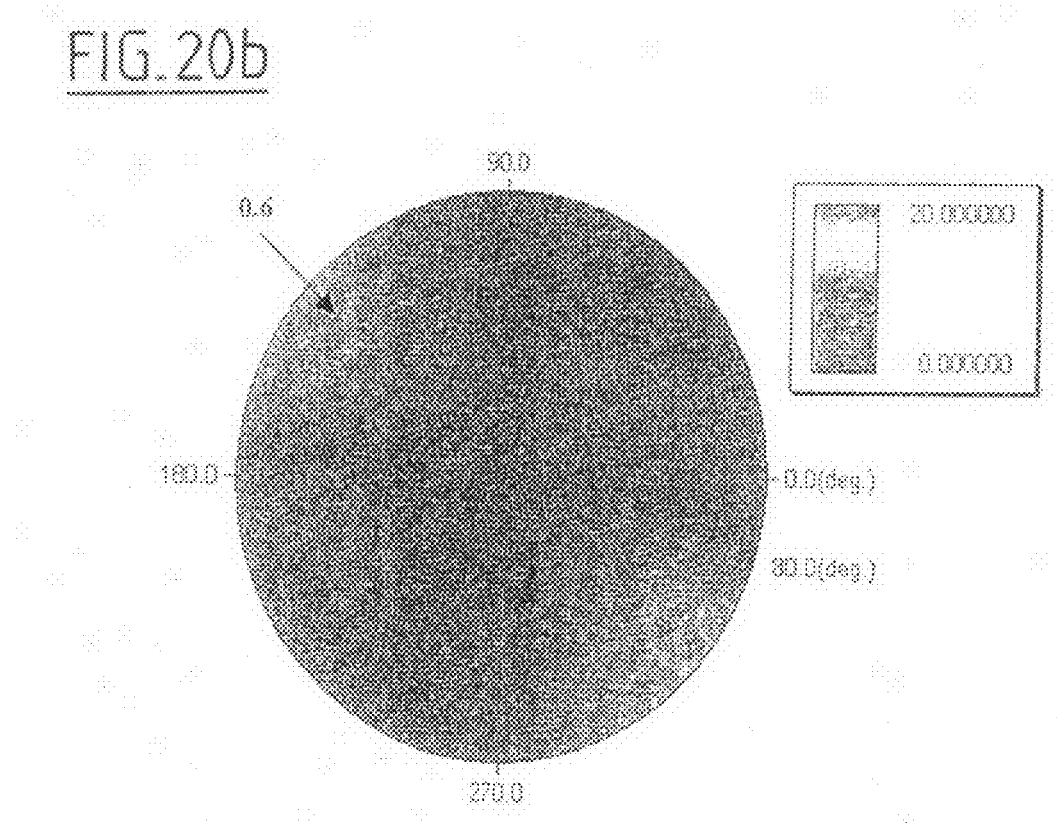
FIG. 20b illustrates color shift conoscopic figure having a maximum value ΔCmax of 0.6.

The contrast and color shift conoscopic figures are given in FIG. 20. The addition of an optimized C+ retarder to the intrinsic πBTN layer brings about a dramatic improvement in the contrast ratio and color shift. Comparing table 6 with table 2 for the intrinsic πBTN layer, it is noted that adding an optimized 65 nm C+ retarder to the intrinsic πBTN layer increases θmax from 49° to 61° and decreases ΔCmax from noticeable 6.7 to an imperceptible 0.6.

Example 2

C+ Compensation Layer Between Polarizer with TAC Substrate and πBTN Liquid Crystal Layer For this configuration a birefringent TAC layer has been added to the polarizer. As before, the polarizer can be oriented either at −41.3° or at 48.7°. The optical performance of these two configurations are simulated, finding an optimum value for the C+ compensator, and the results are given in the table 8 where it is seen that configuration #1 gives a slightly wider viewing cone and slightly less color shift. The stack corresponding to configuration #1 is explicitly presented in table 9.

TABLE 8 the oblique optical performance of mode 1-1 of the single-polarizer reflective πBTN display with one TAC layer and an optimized positive C retarder between the TAC layer and the πBTN LC layer.

| Config. No. | P angle | TAC (nz − no) · d | Positive C (nz − no) · d | ΔCmax | θmax |
|---|---|---|---|---|---|
| #1 | −41.3 | −55 nm | 120 nm | 0.4 | 61° |
| #2 | 48.7° | −55 nm | 115 nm | 0.6 | 59° |

TABLE 9 configuration #1 of πBTN optical compensation with one TAC substrate and an optimized positive uniaxial retarder between the polarizer and the πBTN LC layer.

Figure 16:
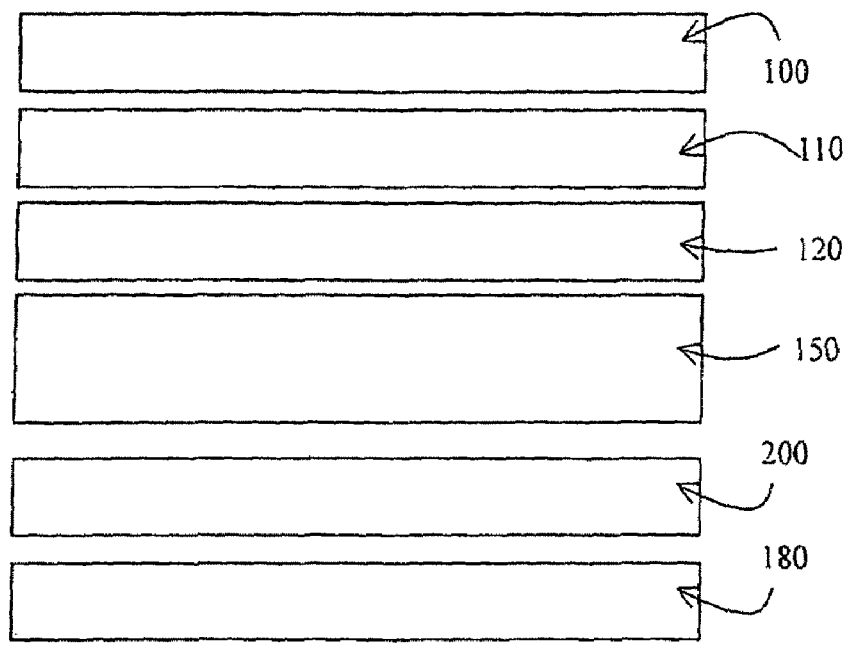
FIG. 16 illustrates a variant of the first embodiment of the present invention.

Observer
Polarizer P = −41.3°
−55 nm TAC
+120 nm C+ retarder
πBTN LC layer with Δnd = 137.8 nm
U twist = −5.7°, T twist = 174.3°
Reflector This example could take the form of any of the embodiments described in connection with FIGS. 16-18. The compensation layer of this embodiment is composed of a positive uniaxial retarder with optical axis perpendicular to the substrates (C+), having a retardation (nz−no)·d=120 nm. The −55 nm retardation of the TAC film on the inner side of the polarizer is taken into account.

Figure 21A:
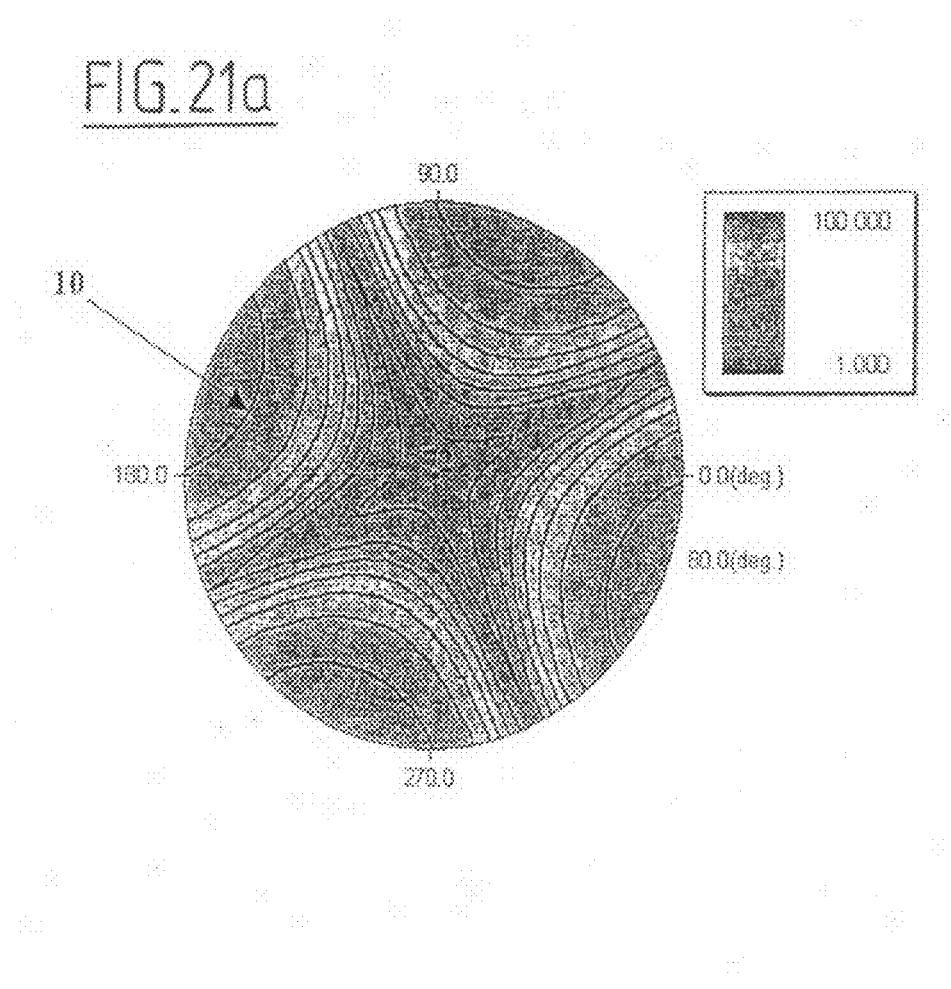
Figure 21B:
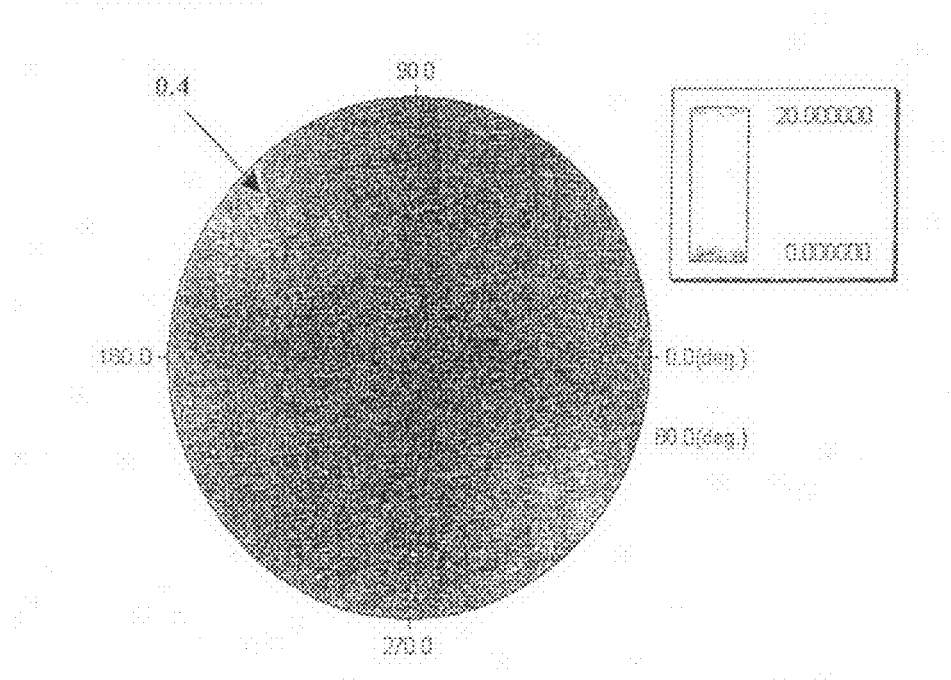
FIG. 21b illustrates color shift conoscopic diagram showing the iso-color shift contour of 2.

The corresponding contrast and color shift conoscopic diagrams are given in FIG. 21. These conoscopic figures should be compared with the nearly conoscopic figures of FIG. 20 for the case where the 65 nm C+ layer is optimized with no TAC layer present. The ΔCmax and θmax data of tables 6 and 8 are also nearly the same. This comparison demonstrates that although the TAC substrate significantly degrades viewing angle performance when no compensator layer is present, the addition of an optimized compensator layer can completely correct for the TAC substrate, ending up with same performance as if the TAC substrate were not present.

Example 3

Polarizer with TAC Substrate and C+ Compensation Layer Between πBTN Liquid Crystal Layer and the Reflector In this example the compensator is located on the other side of the πBTN layer between the πBTN layer and the reflector. This example could take the form of the embodiments described in connection with FIG. 19. For this configuration, the polarizer can be oriented either at −41.3° or at 48.7°. The optical performance of these two configurations are simulated, finding an optimum value for the C+ compensator, and the results are given in the table 10 where it is seen that configuration #2 gives slightly larger θmax and slightly less maximum color shift ΔCmax. The stack corresponding to configuration #2 is explicitly presented in table 11.

TABLE 10 the oblique optical performance of mode 1-1 of the single-polarizer reflective πBTN display with one TAC layer and an optimized C+ retarder between the πBTN liquid crystal layer and the reflector.

| Config. No. | P angle | TAC (nz − no) · d | Positive C (nz − no) · d | ΔCmax | θmax |
|---|---|---|---|---|---|
| #1 | −41.3° | −55 nm | 70 nm | 4.7 | 55° |
| #2 | 48.7° | −55 nm | 75 nm | 3.9 | 56° |

TABLE 11 example of πBTN optical compensation using a C+ uniaxial retarder between the πBTN LC layer and the reflector.

Observer
Polarizer P = +48.7°
−55 nm TAC
πBTNLC layer with Δnd = 137.8 nm
U twist = −5.7°, T twist = 174.3°
+75 nm positive C plate
Reflector The compensation layer for this example is composed of a positive uniaxial retarder with optical axis perpendicular to the substrates (C+), having an optimized retardation (nz−no)·d=75 nm. The −55 nm retardation of the TAC film on the inner side of the polarizer is taken into account.

Figure 22A:
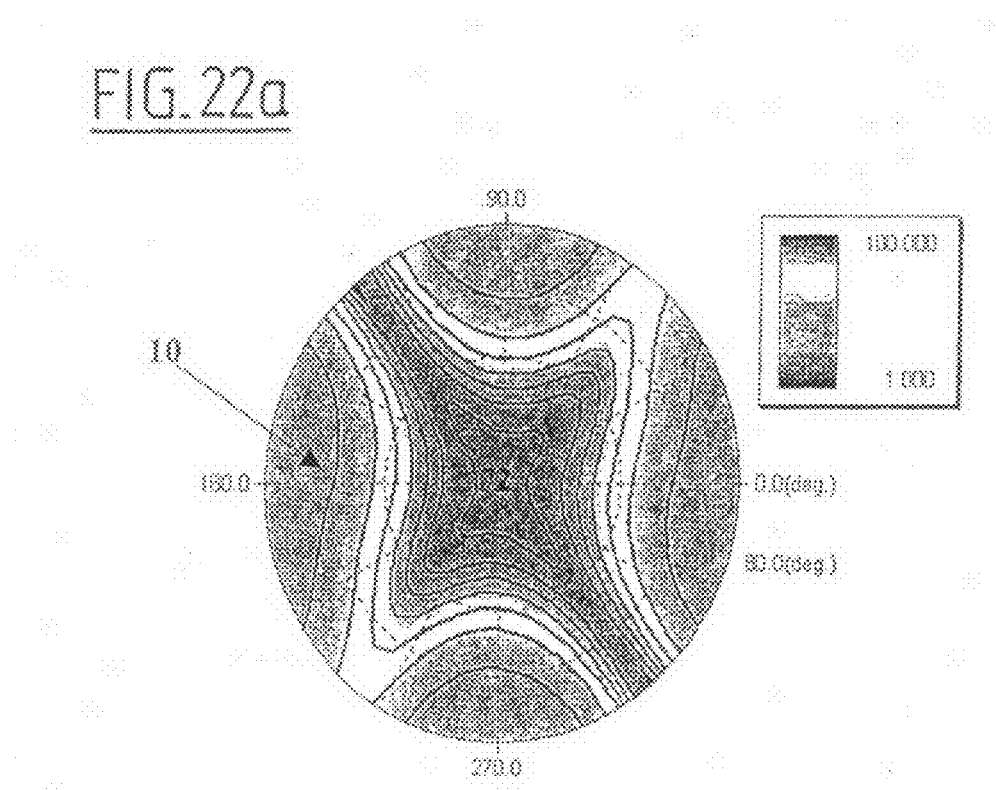
FIG. 22 illustrates optical performance of compensated single-polarizer πBTN reflective configuration of the invention using a 75 nm C+ retarder on top of the reflector and including a TAC polarizer substrate as described in table 11. More precisely.
Figure 22B:
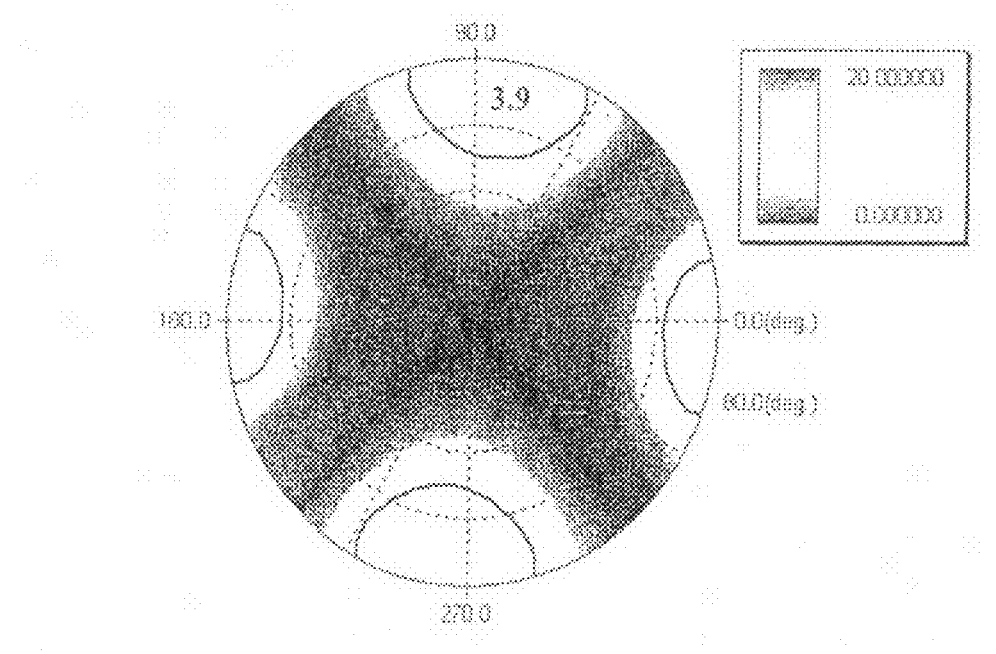

The corresponding contrast and color shift conoscopic diagrams are given in FIG. 22. Comparing FIG. 22 with FIG. 21 and table 10 with table 8 shows that θmax is wider (61° vs. 56°) and the color shift ΔCmax is significantly less (0.4 vs. 3.9) if the optimized C+ compensator is located between the polarizer and the πBTN LC layer rather than between the πBTN LC layer and the reflector.

Example 4

Biaxial Compensation Layer with Nz=−5 Between Polarizer with TAC Substrate and πBTN Liquid Crystal Layer There are four possibilities for this configuration, the polarizer can be in either of its two orientations and the x-axis (slow axis) of the biaxial retarder can either be parallel or perpendicular to the polarizer absorption axis. Exact positioning, parallel or perpendicular, gives best results, but some tolerance of +/−5° is acceptable.

Each of these four configurations are simulated and the results are presented in table 12. This example could take the form of any of the embodiments described in connection with FIGS. 16-19.

TABLE 12 the four possible configurations for πBTN optical compensation using a biaxial compensation layer with Nz = −5 between the polarizer and the LC layer.

| Config. No. | P angle | nx angle | Optimum (nx − ny)·d | Optimum (nx − nz)·d | ΔCmax | θmax |
|---|---|---|---|---|---|---|
| #1 | 48.7° | 48.7° | 22 nm | −110 nm | 1.1 | 60° |
| #2 | 48.7° | −41.3° | 22 nm | −110 nm | 0.5 | 59° |
| #3 | −41.3° | 48.7° | 22 nm | −110 nm | 0.6 | 62° |
| #4 | −41.3° | −41.3° | 22 nm | −110 nm | 0.9 | 63° |

Configuration #3 gives the best overall compromise between color shift and contrast ratio. This configuration is explicitly diagrammed in table 13.

TABLE 13

Configuration #3 example of πBTN optical compensation using a biaxial compensation layer with Nz = −5 between the polarizer and the LC layer.

Figure 23A:
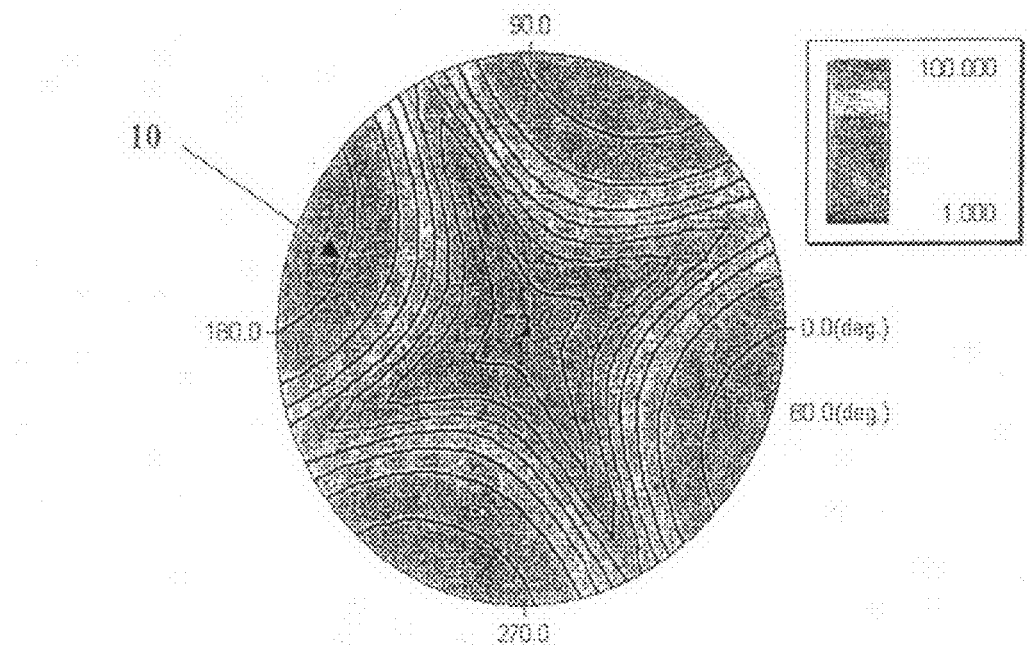
Figure 23B:
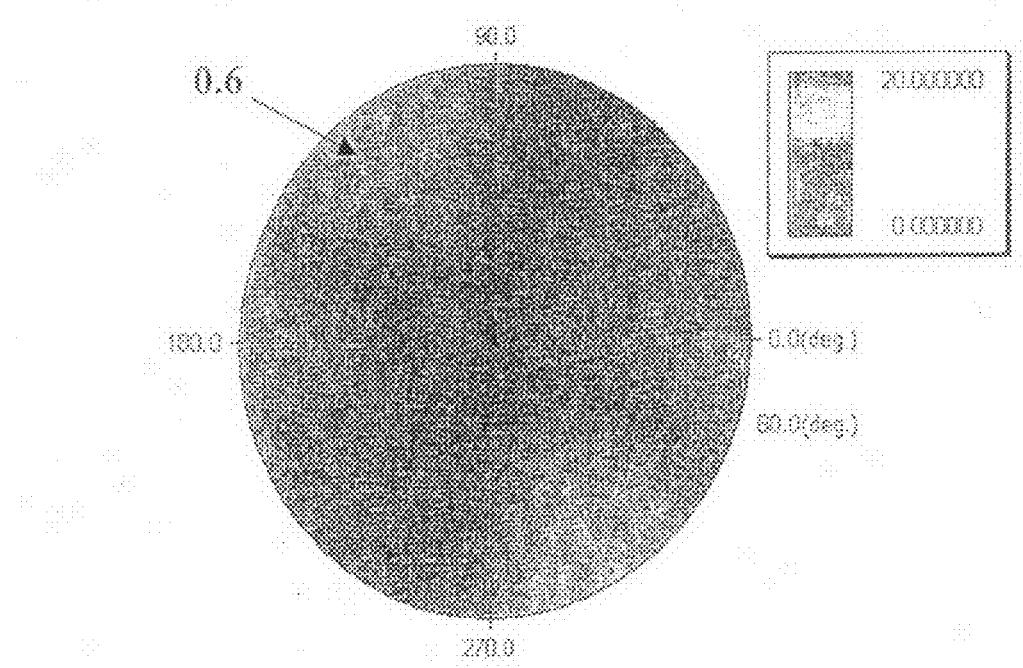
FIG. 23b illustrates color shift conoscopic figure having a maximum value ΔCmax of 0.6.

Observer
Polarizer P = −41.3°
−55 nm TAC
Biaxial compensator with Nz = −5 with (nx − ny)·d = 22 nm and (nx − nz)·d = −110 nm with nx angle 48.7°
πBTN LC layer with Δnd = 137.8 nm
U twist = −5.7°, T twist = 174.3°
Reflector The corresponding contrast and color shift conoscopic diagrams of configuration #3 are presented in FIG. 23. Comparing FIG. 23b with FIG. 21b it can be seen that the maximum color shift of 0.6 with the biaxial Nz=−5 compensator is equally as small as the color shift with the C+ plate. Comparison of FIG. 23a with 21a shows that the biaxial Nz=−5 compensator gives a slightly wider contrast viewing cone than the C+ plate. The polar angle θmax is 62° for the Nz=−5 biaxial compensator, whereas it is a slightly narrower 60° for the C+ compensator.

Example 5

Biaxial Compensation Layer with Nz=0 Between Polarizer with TAC Substrate and πBTN Liquid Crystal Layer There are four possibilities for this configuration, the polarizer can be either of its two orientations and the x-axis (slow axis) of the biaxial retarder can either be parallel or perpendicular to the polarizer absorption axis. Exact positioning, parallel or perpendicular, gives best results, but some tolerance of +/−5° is acceptable.

Each of thee four configurations are simulated and optimized and the results are given in table 14. This example could take the form of any of the embodiments described in connection with FIGS. 16-18.

TABLE 14 the four possible configurations for πBTN optical compensation using a biaxial compensation layer with Nz = 0 between the polarizer and the LC layer.

| Config. No. | P angle | nx angle | Optimum (nx − ny)·d | Optimum (nx − nz)·d | ΔCmax | θmax |
|---|---|---|---|---|---|---|
| #1 | 48.7° | 48.7° | 160 nm | 0 nm | 0.6 | 70° |
| #2 | 48.7° | −41.3° | 175 nm | 0 nm | 4.0 | 65° |
| #3 | −41.3° | 48.7° | 175 nm | 0 nm | 4.0 | 65° |
| #4 | −41.3° | −41.3° | 155 nm | 0 nm | 2.8 | 68° |

Configuration #1 gives the best performance for both color shift and contrast ratio. The configuration is explicitly diagrammed in table 15.

TABLE 15

Configuration #1 example of πBTN optical compensation using a biaxial compensation layer with Nz = 0 between the polarizer and the πBTN liquid crystal layer.

Figure 24A:
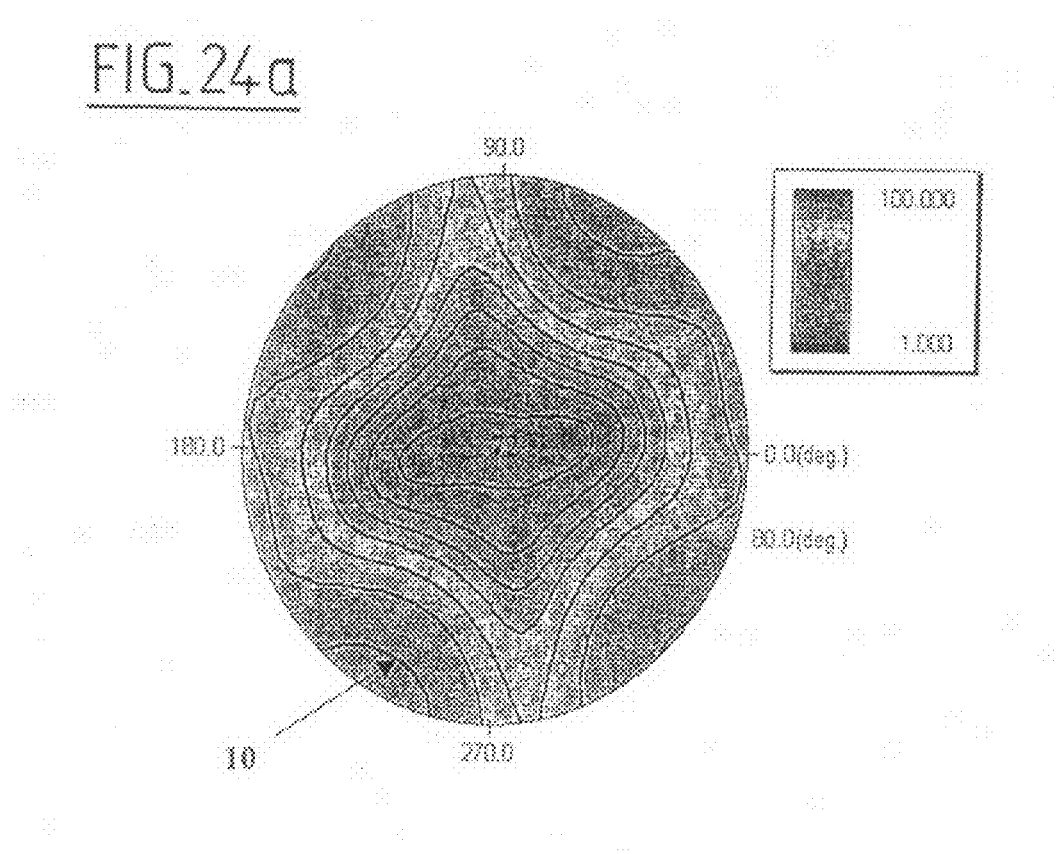
Figure 24B:
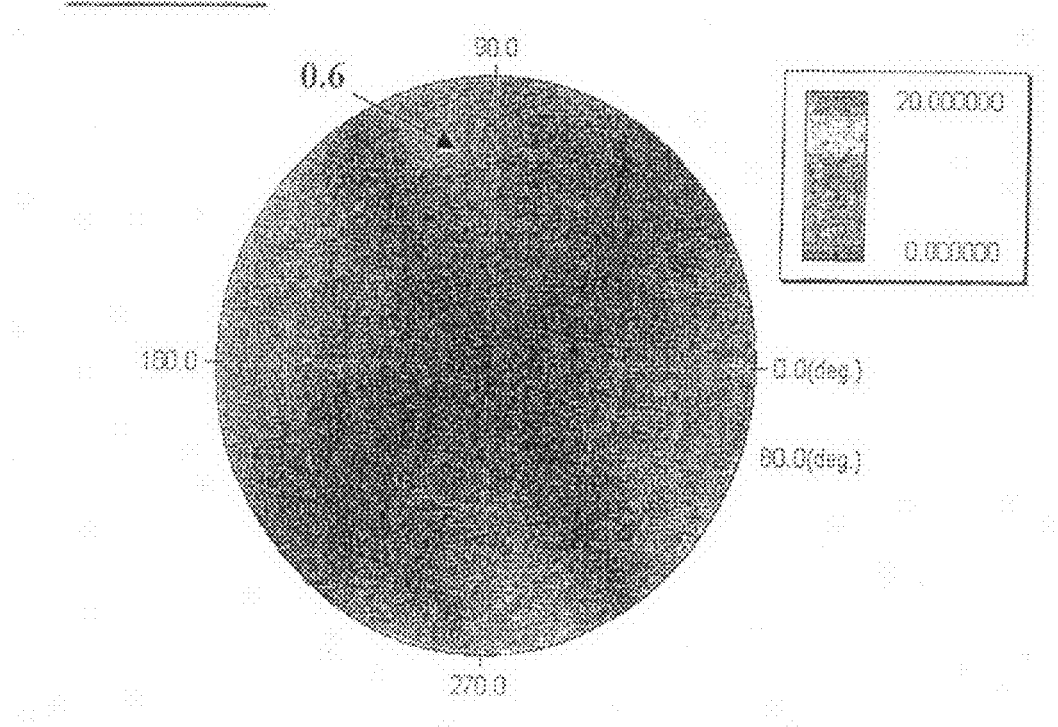
FIG. 24b illustrates color shift conoscopic figure having a maximum value ΔCmax of 0.6.

Observer
Polarizer P = 48.7°
−55 nm TAC
Biaxial compensator with Nz = 0 with (nx − ny)d = 160 nm and (nx − nz)d = 0 nm with nx angle 48.7°
πBTN LC layer with Δnd = 137.8 nm
U twist = −5.7°, T twist = 174.3°
Reflector The corresponding contrast and color shift conoscopic diagrams of configuration #1 are given in FIG. 24. Comparing FIG. 24b with 23b and FIG. 21b it can be seen that the maximum color shift of 0.6 remains equally small for the Nz=0, Nz=−5 and Nz=−∞ retarders. But the Nz=0 (θmax=70°) compensates somewhat better for contrast than the Nz=−5 compensator (θmax=62°) or Nz=−∞ compensator (θmax=61°).

Example 6

Biaxial Compensation Layer with Nz=½ Between Polarizer with TAC Substrate and πBTN Liquid Crystal Layer There are four possibilities for this configuration, the polarizer can be either of its two orientations and the x-axis (slow axis) of the biaxial retarder can either be parallel or perpendicular to the polarizer absorption axis. Exact positioning, parallel or perpendicular, gives best results, but some tolerance of +/−5° is acceptable.

Each of thee four configurations are simulated and optimized and the results are given in table 16. This example could take the form of any of the embodiments described in connection with FIGS. 16-18.

TABLE 16 the four possible configurations for πBTN optical compensation using a biaxial compensation layer with Nz = ½ between the polarizer and the LC layer.

| Config. No. | P angle | nx angle | Optimum (nx − ny)·d | Optimum (nx − nz)·d | ΔCmax | θmax |
|---|---|---|---|---|---|---|
| #1 | 48.7° | 48.7° | 150 nm | 75 nm | 5.3 | 75° |
| #2 | 48.7° | −41.3° | 390 nm | 195 nm | 5.6 | 75° |
| #3 | −41.3° | 48.7° | 400 nm | 200 nm | 7.0 | 76° |
| #4 | −41.3° | −41.3° | 140 nm | 70 nm | 4.2 | 77° |

Configuration #4 gives the best performance for both color shift and contrast ratio. The configuration is explicitly diagrammed in table 17.

TABLE 17

Configuration #4 example of πBTN optical compensation using a biaxial compensation layer with Nz = ½ between the polarizer and the πBTN liquid crystal layer.

Figure 25A:
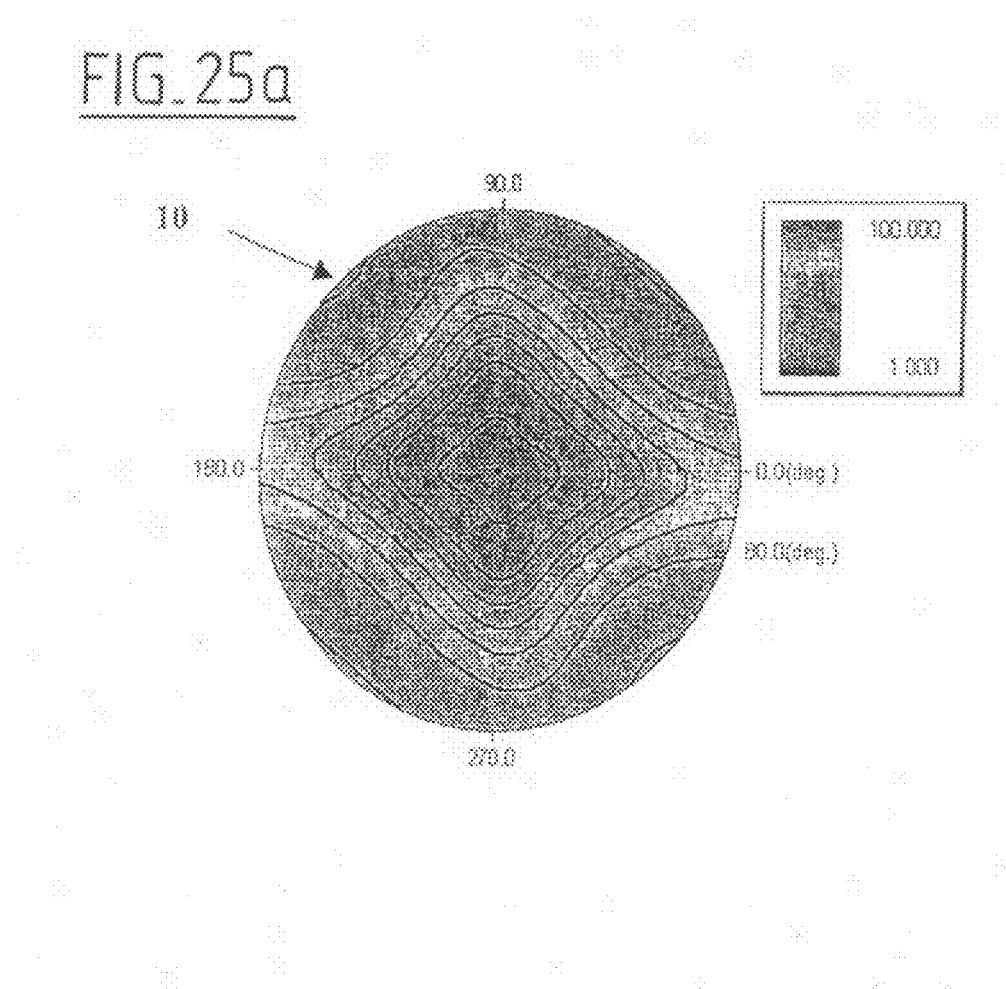
Figure 25B:
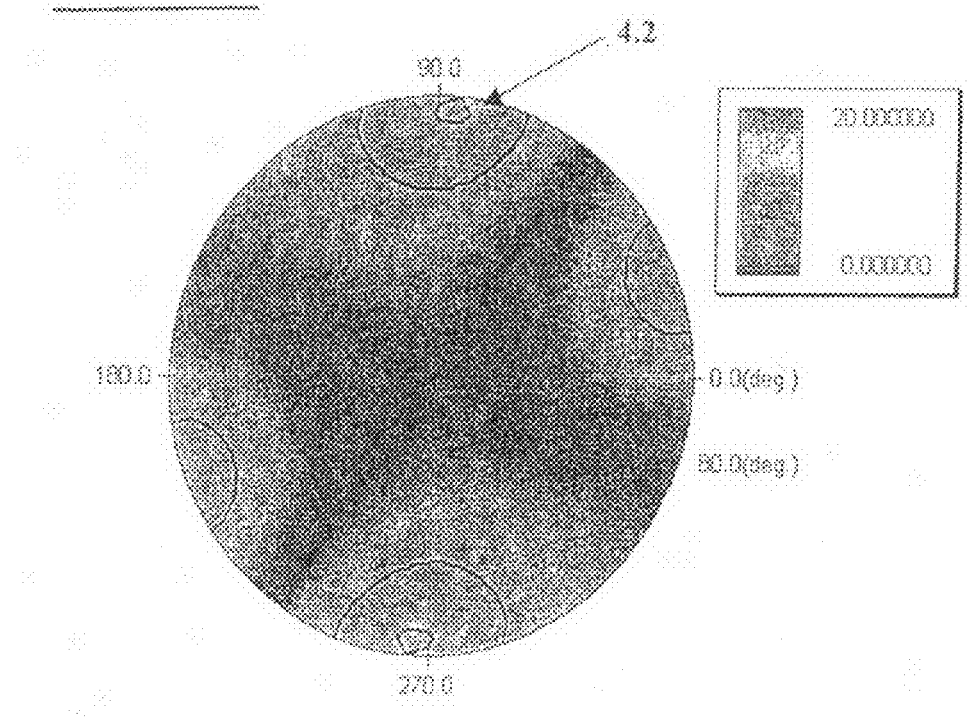
FIG. 25b illustrates color shift conoscopic diagram showing the iso-color shift contours from center outward of 2 and 4.

Observer
Polarizer P = −41.3°
−55 nm TAC
Biaxial compensator with Nz = ½ with (nx − ny)d = 140 nm and (nx − nz)d = 70 nm with nx angle −41.3°
πBTN LC layer with Δnd = 137.8 nm
U twist = −5.7°, T twist = 174.3°
Reflector The corresponding contrast and color shift conoscopic diagrams of configuration #1 are given in FIG. 25. Comparing with the results for the other compensation layers with Nz=−∞, −5 and 0 it is seen from FIG. 25 and table 15 that an optimized biaxial retarder with Nz=½ gives the widest contrast cone but also significantly larger color shift.

We can see from all those examples that calculated optimum compensation films described by the invention has no relationship with uniaxial quarter waveplate (in plane (x,y) retardation equal λ/4, no out of plane (x,z) retardation), optimized for green light, dedicated to change linear polarization into circular one, and combining for this purpose λ/4 retardation with 45° between entrance polarizer and optical axis, like in the Ostermann prior art. This is because the films described in the invention are the result of a calculation made for improving global optical performance at oblique viewing, not at normal incidence.

Example 7 (This Example is Outside the Invention)

Biaxial Compensation Layer with Nz=1 Between Polarizer with TAC Substrate and πBTN Layer There are four possibilities for this configuration, the polarizer can be either in the standard or alternate orientation and the x-axis (slow axis) of the biaxial retarder can either be parallel or perpendicular to the polarizer absorption axis. Each of thee four configurations are simulated and the results are given in table 18. This example could take the form of any of the embodiments described in connection with FIGS. 16-18.

TABLE 18 the four possible configurations for πBTN optical compensation using a biaxial compensation layer with Nz = 1 between the polarizer and the LC layer.

| Config. No. | P angle | nx angle | Optimum (nx − ny) · d | Optimum (nx − nz) · d | ΔCmax | θmax |
|---|---|---|---|---|---|---|
| #1 | 48.7° | 48.7° | 320 nm | 320 nm | 22.2 | 55° |
| #2 | 48.7° | −41.3° | 440 nm | 440 nm | 45.6 | 51° |
| #3 | −41.3° | 48.7° | 450 nm | 450 nm | 47.5 | 51° |
| #4 | −41.3° | −41.3° | 315 nm | 315 nm | 19.3 | 57° |

Configuration #4 gives the best performance for both color shift and contrast ratio. The configuration is explicitly diagrammed in table 19.

TABLE 19

Configuration #4 example of πBTN optical compensation using a biaxial compensation layer with Nz = 1 between the polarizer and the πBTN layer.

Figure 26A:
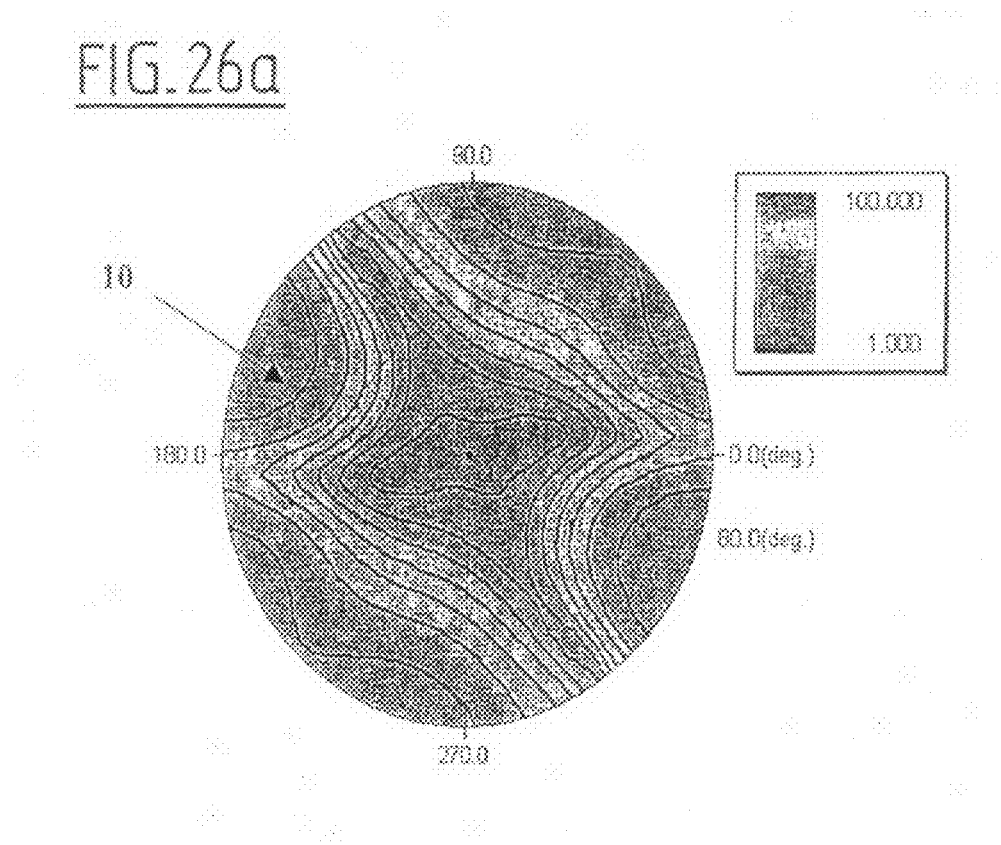
Figure 26B:
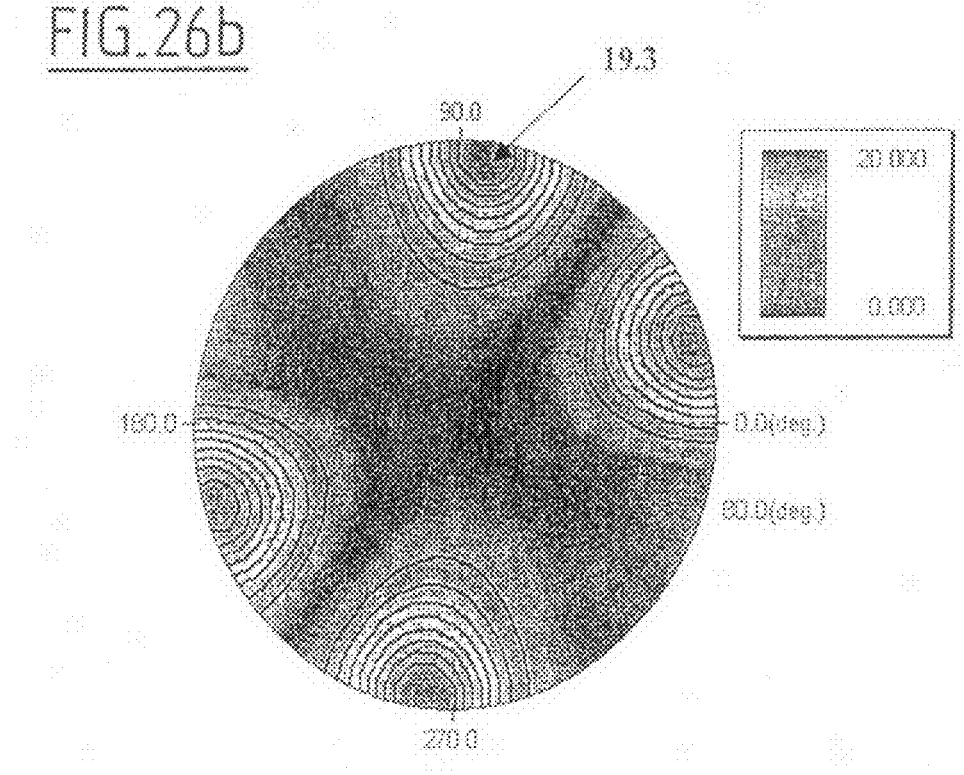
FIG. 26b illustrates color shift conoscopic diagram showing the iso-color shift contours from center outward of 2, 4, 6, 8, 10, 12, 14 and 16.

Observer
Polarizer P = −41.3°
−55 nm TAC
Biaxial compensator with Nz = 1 with (nx − ny)d = 315 nm and (nx − nz)d = 315 nm with nx angle −41.3°
πBTN layer with Δnd = 137.8 nm
U twist = −5.7°, T twist = 174.3°
Reflector The corresponding contrast and color shift conoscopic diagrams of configuration #4 are given in FIG. 26. Comparing with FIGS. 25, 24 and 23 for the Nz=½, Nz=0 and Nz=−5 biaxial retarders it can be seen that the Nz=1 compensator introduces massive color shifts and narrowing of the contrast ratio viewing cone.

Example 8

Compensation Layer Consisting of a 40 nm Positive a Plate on Top of a Positive C Plate Between the Polarizer with TAC Substrate and πBTN Layer The compensation layer can also consist of a combination of more then one birefringent layer and the different layers need not be of the same type. In this example the compensation layer consists of a 40 nm positive A plate on top of a positive C plate and this sandwich is placed between the polarizer and the πBTN layer. There are four possibilities for this configurations the polarizer can be either of its two orientations and the x-axis (slow axis) of the A plate can either be parallel or perpendicular to the polarizer absorption axis. Each of these four configurations are simulated and the results are given in table 20. This example could take the form of any of the embodiments described in connection with FIGS. 16-18.

TABLE 20 the four possible configurations for πBTN optical compensation using consisting of a 40 nm positive A plate on top of a positive C plate between polarizer and LC cell

| Config. No. | P angle | nx angle A plate | Optimum (nx − no) · d C plate | ΔCmax | θmax |
|---|---|---|---|---|---|
| #1 | 48.7° | 48.7° | 115 nm | 0.9 | 51° |
| #2 | 48.7° | −41.3° | 125 nm | 1.1 | 68° |
| #3 | −41.3° | 48.7° | 130 nm | 1.3 | 74° |
| #4 | −41.3° | −41.3° | 120 nm | 0.6 | 52° |

Configuration #3 has an extremely wide viewing angle and the color shift is also quite small. The configuration is explicitly diagrammed in table 21.

TABLE 21

Configuration #3 example of πBTN optical compensation consisting of a 40 nm A plate on top of a C plate between polarizer and the LC cell Observer
Polarizer P = −41.3°
−55 nm TAC
40 nm A plate with slow axis at 48.7°

TABLE 21-continued

Figure 27A:
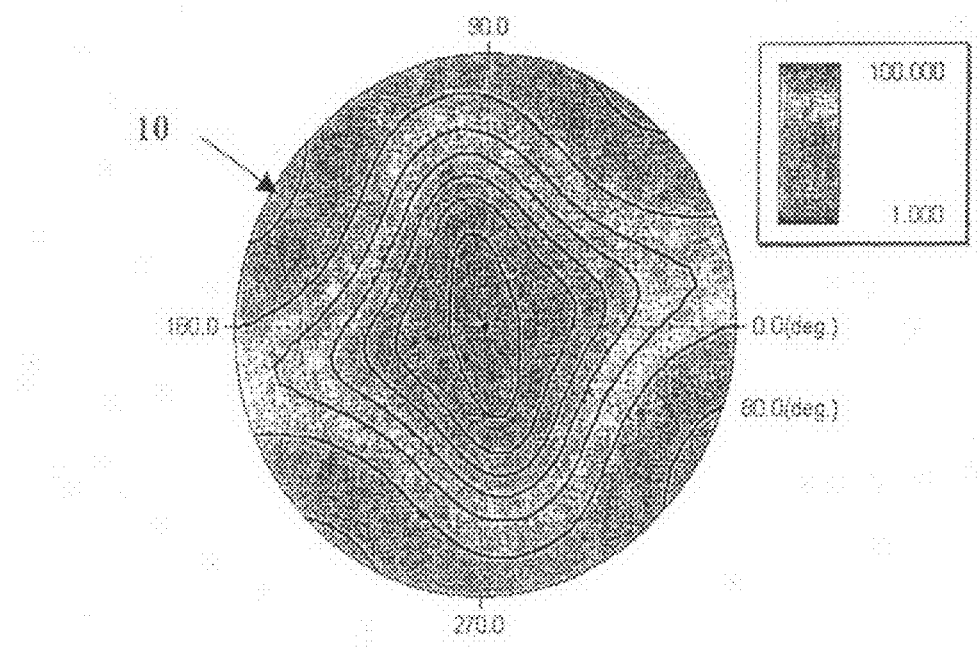
Figure 27B:
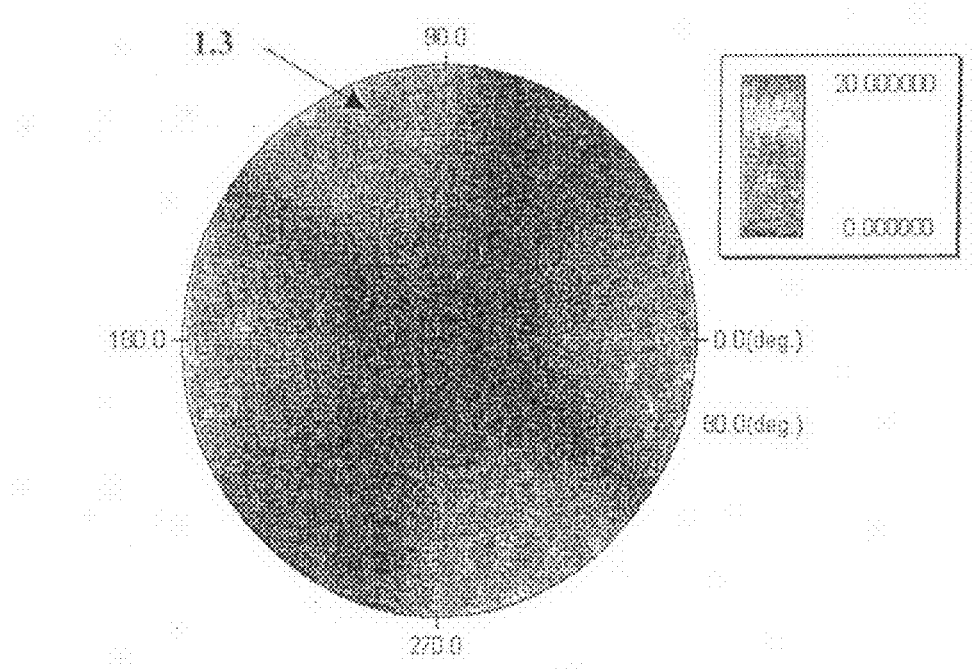
FIG. 27b illustrates color shift conoscopic figure having a maximum value ΔCmax of 1.3.

Configuration #3 example of πBTN optical compensation
consisting of a 40 nm A plate on top of a C plate between
polarizer and the LC cell 130 nm positive C plate
πBTN layer with Δnd = 137.8 nm
U twist = −5.7°, T twist = 174.3°
Reflector The corresponding contrast and color shift conoscopic diagrams of configuration #3 are given in FIG. 27.

Example 9

Compensation Layer Consisting of a C Plate on Top of a 40 nm Positive A Between Polarizer with TAC Substrate and πBTN Layer This embodiment differs from the previous example 8 in that the positions of the positive C plate and the A plate have been interchanged. There also are four possibilities for this configuration, the polarizer can be either of its two orientations and the x-axis (slow axis) of the positive A plate can either be parallel or perpendicular to the polarizer absorption axis. Each of thee four configurations are simulated and the results are given in table 22. This example could take the form of any of the embodiments described in connection with FIGS. 16-18.

TABLE 22 the four possible configurations for πBTN optical compensation
using consisting of a positive C plate on top of a 40 nm A plate
between polarizer and LC cell

| Config. No. | P angle | nx angle A plate | Optimum (nx − no) · d C plate | ΔCmax | θmax |
|---|---|---|---|---|---|
| #1 | 48.7° | 48.7° | 165 nm | 1.0 | 70° |
| #2 | 48.7° | −41.3° | 120 nm | 4.5 | 48° |
| #3 | −41.3° | 48.7° | 125 nm | 3.9 | 49° |
| #4 | −41.3° | −41.3° | 175 nm | 4.4 | 63° |

Configuration #1 has the smallest color shift and the widest viewing angle for contrast. The configuration is explicitly diagrammed in table 23.

TABLE 23

Configuration #1 example of πBTN optical compensation
consisting of a positive C plate on top of a 40 nm A plate between
polarizer and LC cell.

Figure 28A:
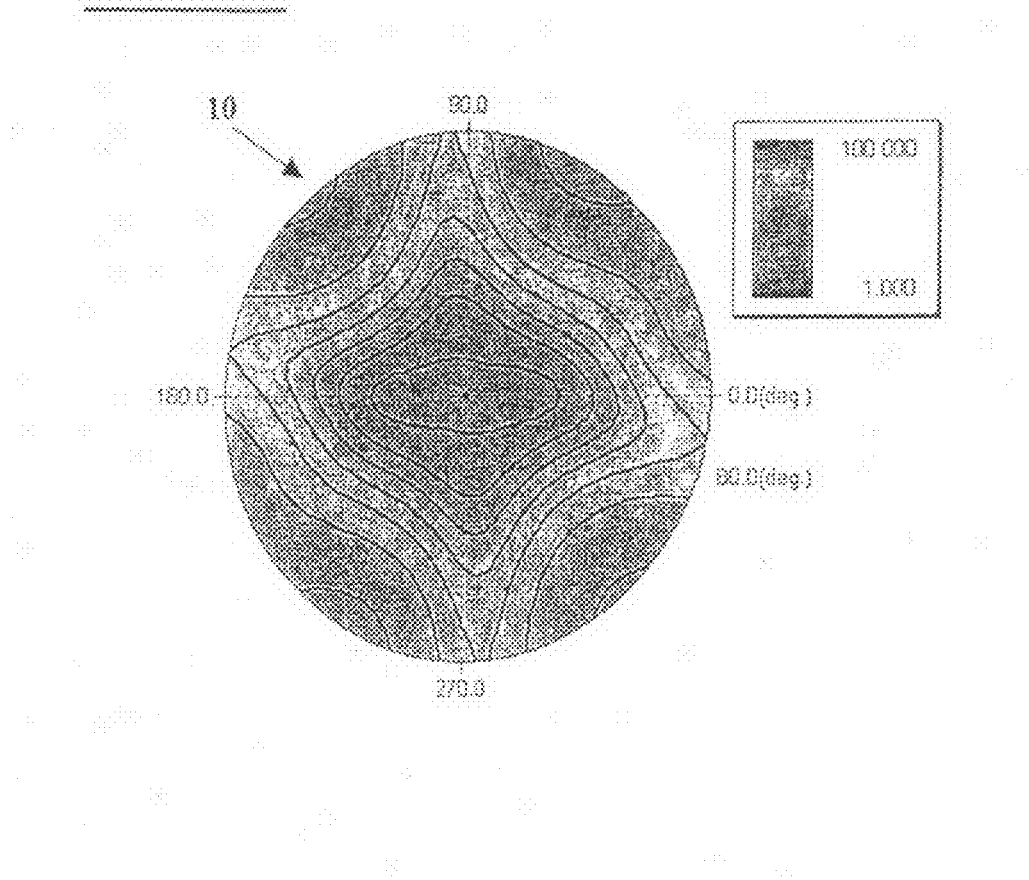
Figure 28B:
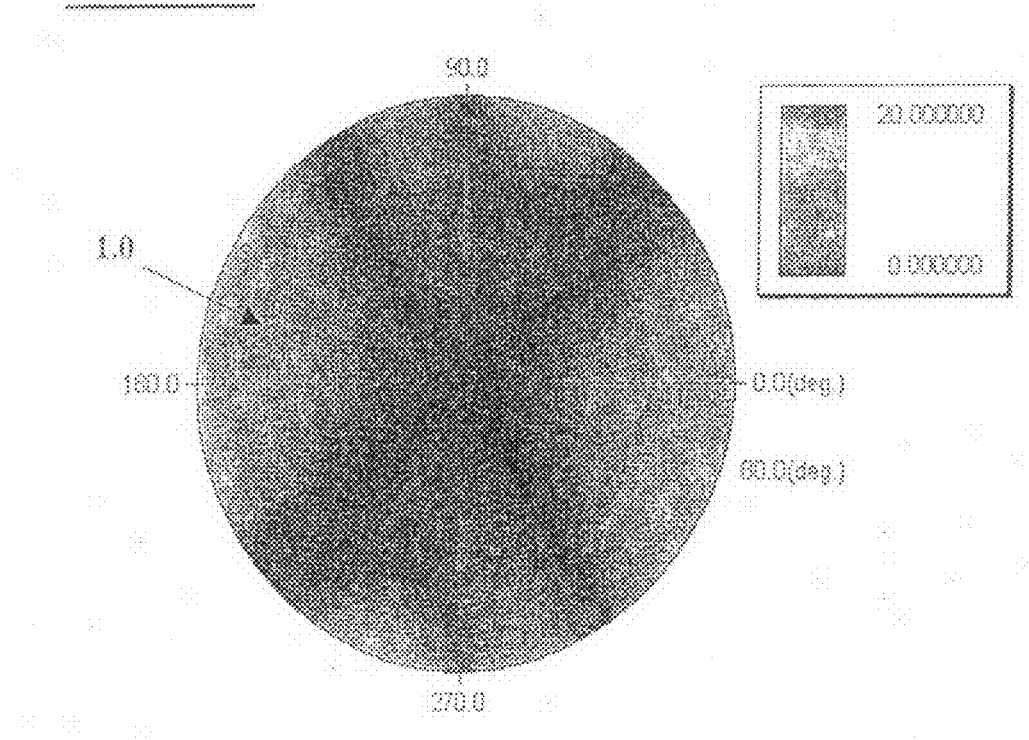
FIG. 28b illustrates color shift conoscopic figure having a maximum value ΔCmax of 1.0.

Observer
Polarizer P = 48.7°
−55 nm TAC
165 nm positive C plate
40 nm A plate with slow axis at 48.7°
πBTN layer with Δnd = 137.8 nm
U twist = −5.7°, T twist = 174.3°
Reflector The corresponding contrast and color shift conoscopic diagrams of configuration #1 are given in FIG. 28. It is noted that θmax of configuration. #1 is slightly less than θmax of configuration #3 of the previous example 8 where the A and C plates are interchanged with the A plate on top (70° vs. 74°). The maximum color shift ΔCmax is also smaller (1.0 vs. 1.3) but both these values are small enough to be nearly imperceptible.

Figure 8A:
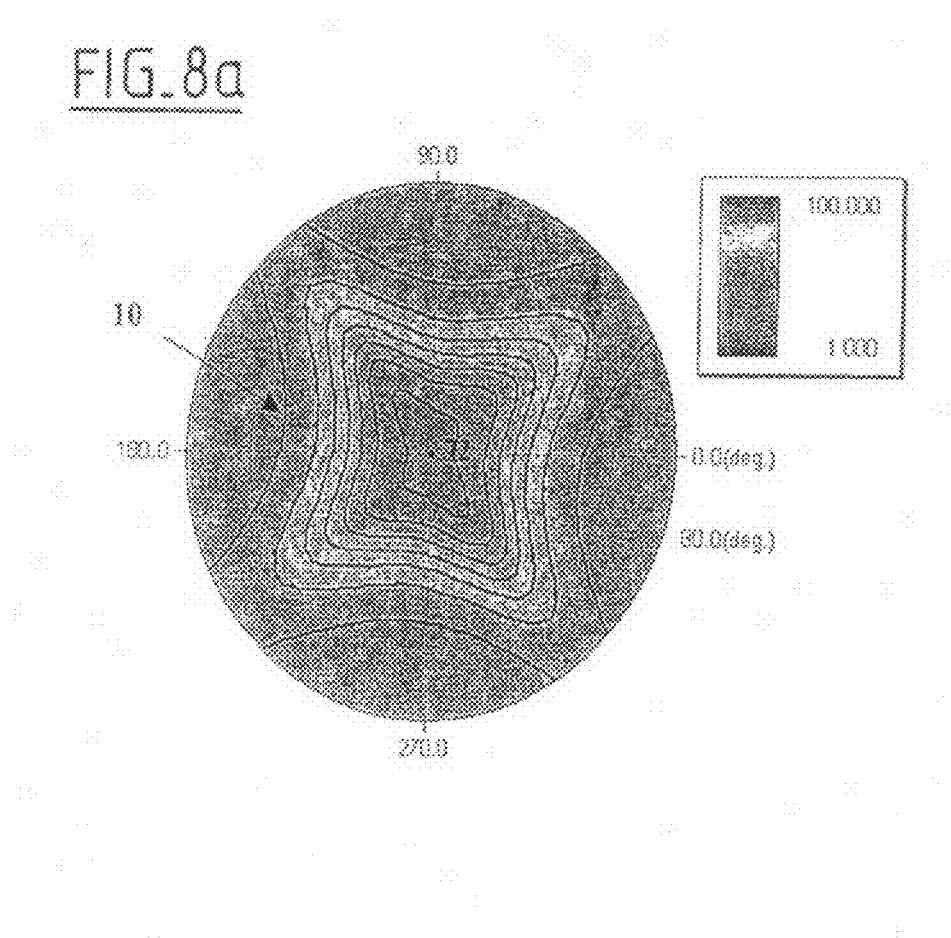
Figure 8B:
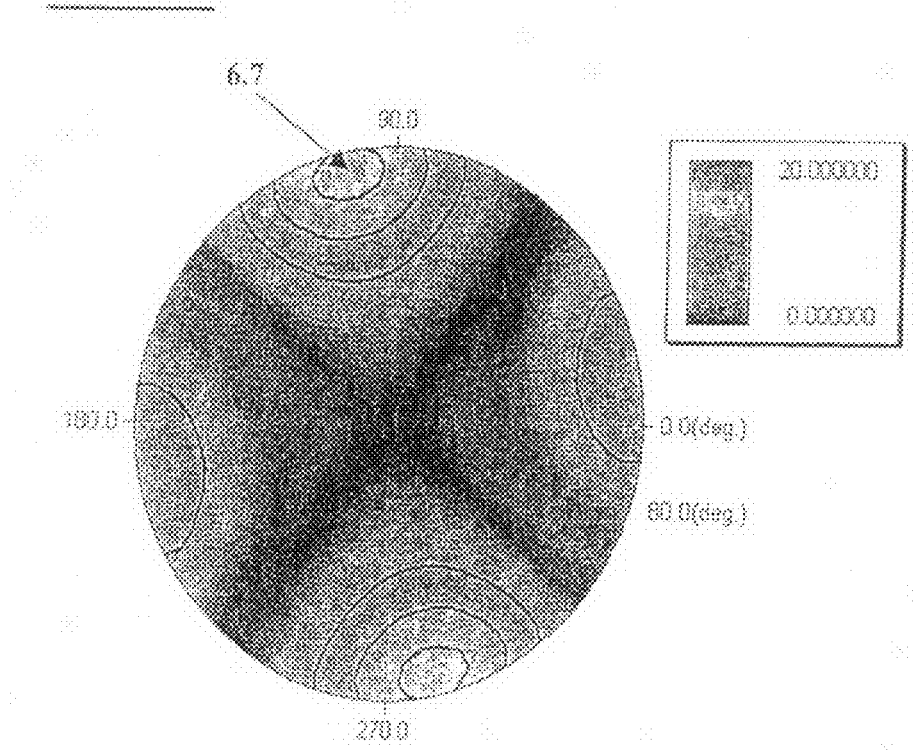
FIG. 8b illustrates color shift conoscopic diagram showing the iso-color shift contours from center outward of 2, 4 and 6.
Figure 10A:
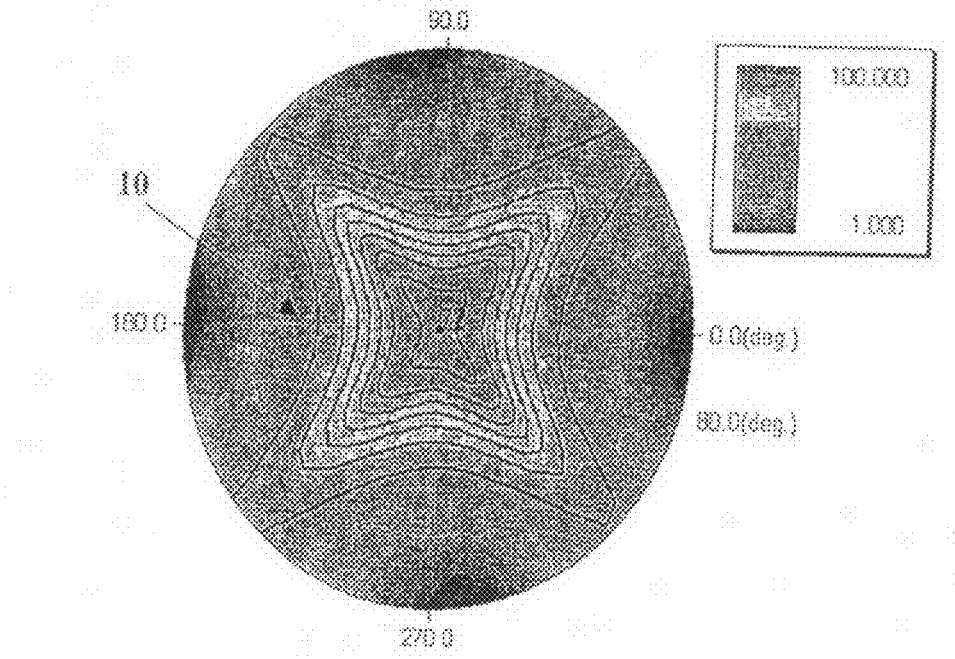
Figure 10B:
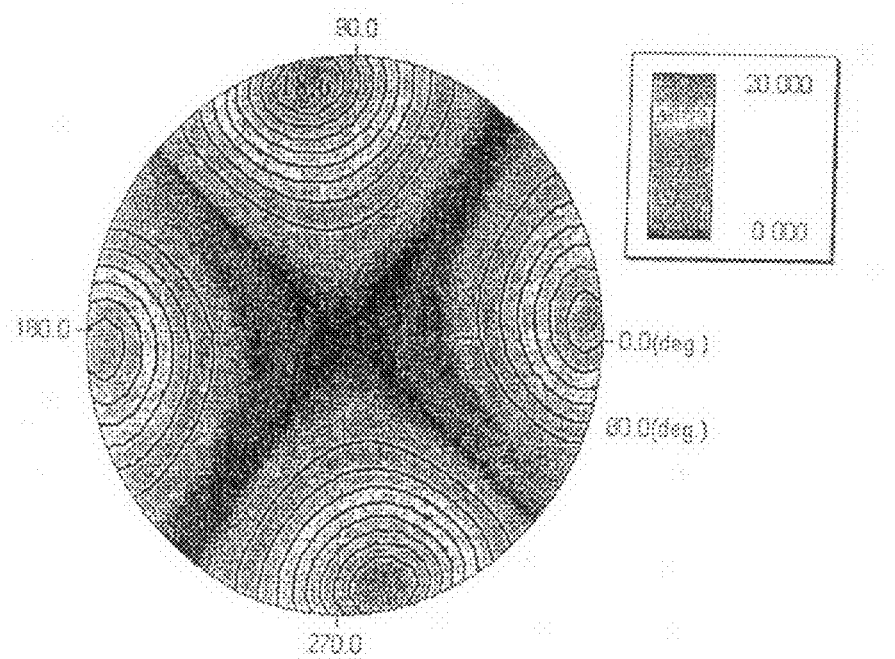
FIG. 10b illustrates the color shift conoscopic diagram showing the iso-color shift contours from center outward of 2, 4, 6, 8, 10, 12, 14 and 16.
Figure 11:
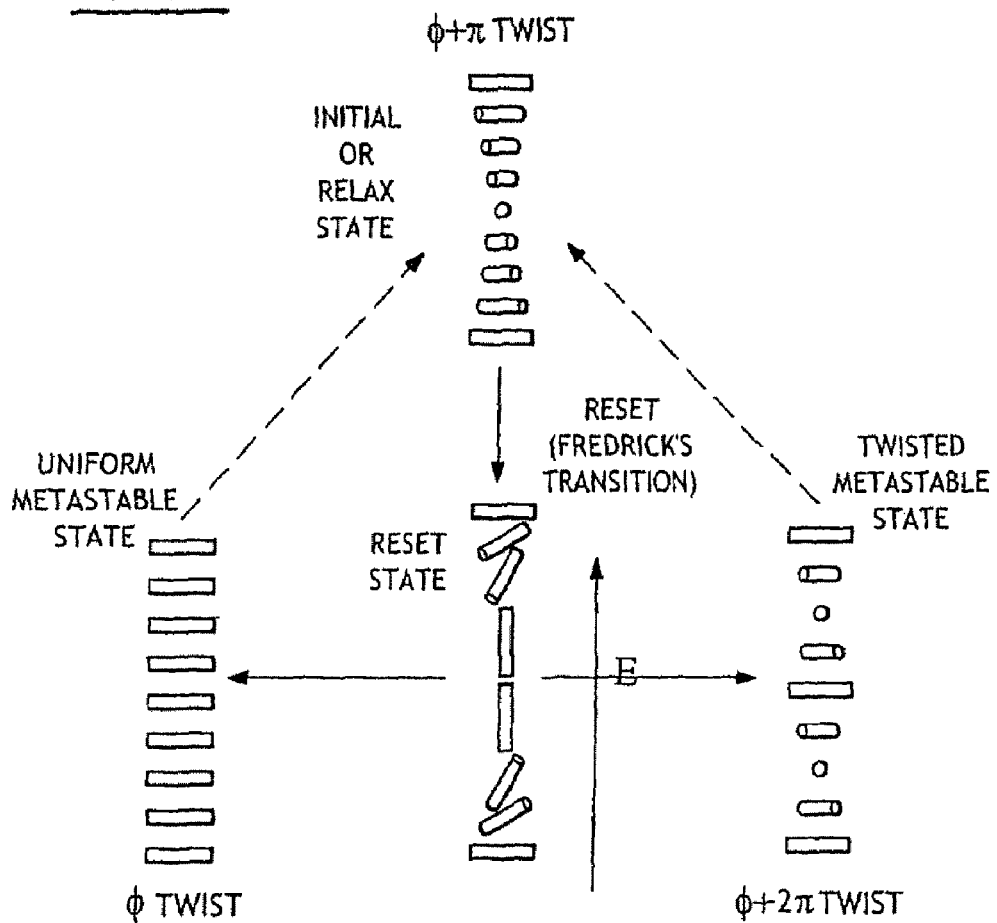
FIG. 11 illustrates the principle of a 2πBTN display according to the state of the art.
Figure 12:
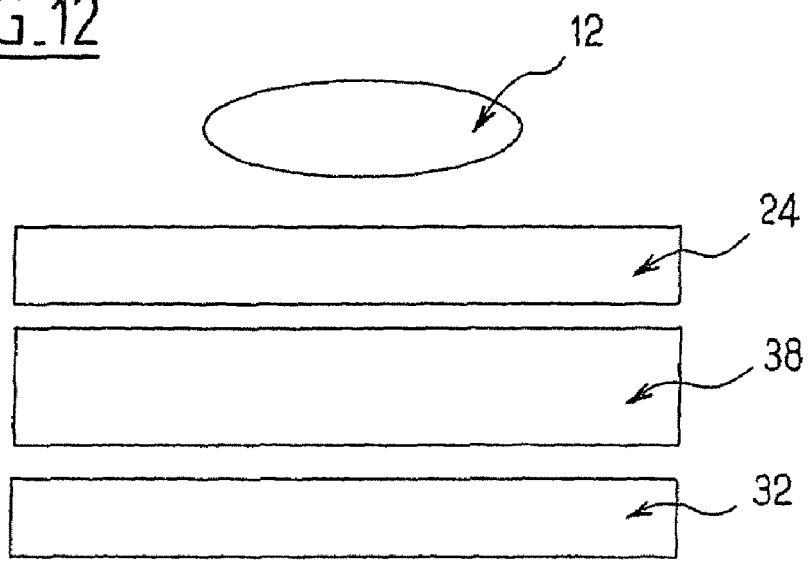
FIG. 12 illustrates the example of an optical stack for a single-polarizer reflective 2πBTN display according to the state of the art.
Figure 13A:
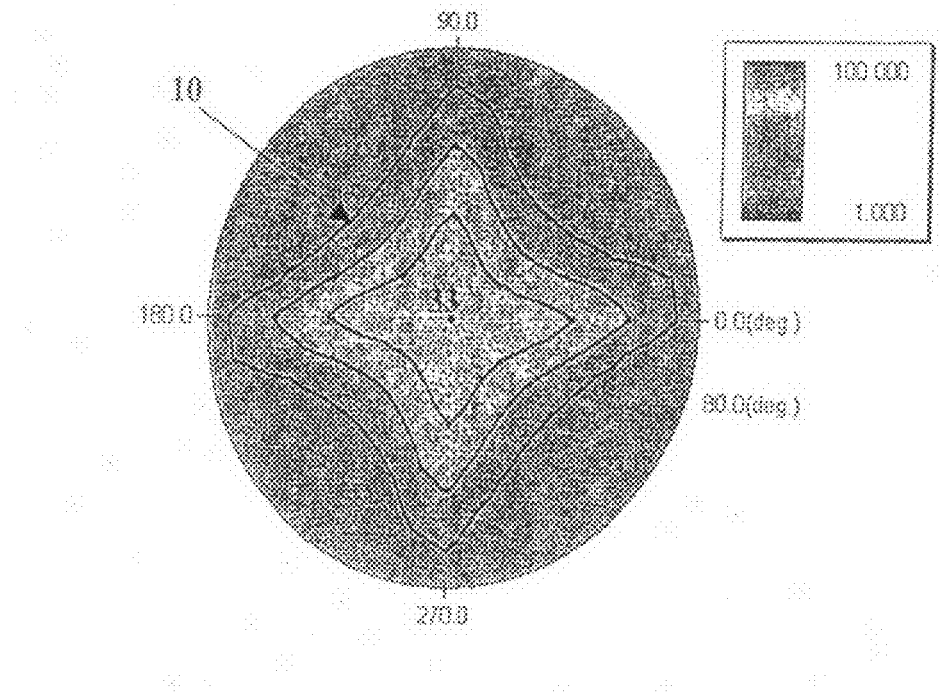
Figure 13B:
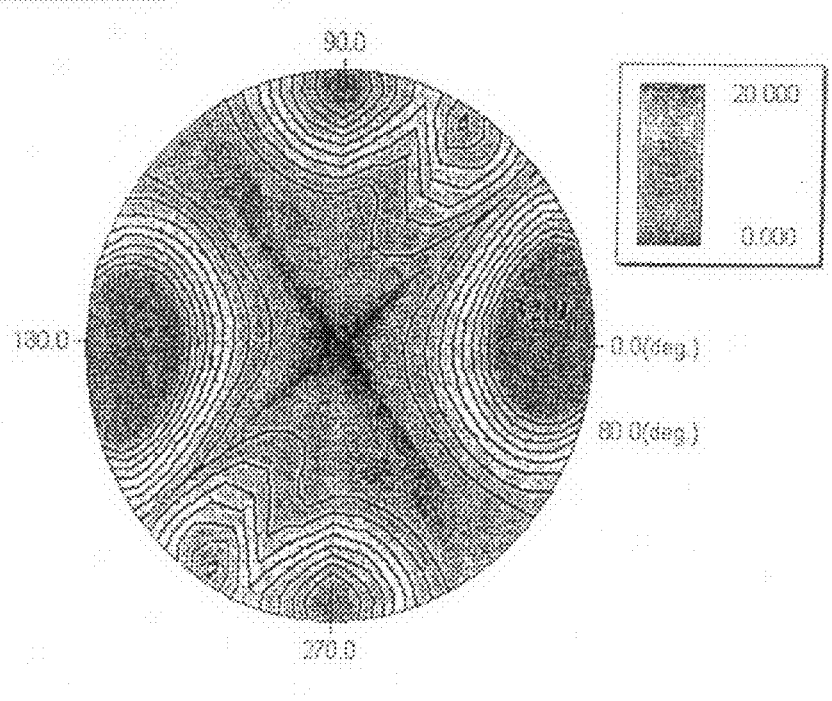
FIG. 13b illustrates color shift conoscopic diagram showing the iso-color shift contours from center outward of 2, 4, 6, 8, 10, 12, 14 and 16.
Figure 14:
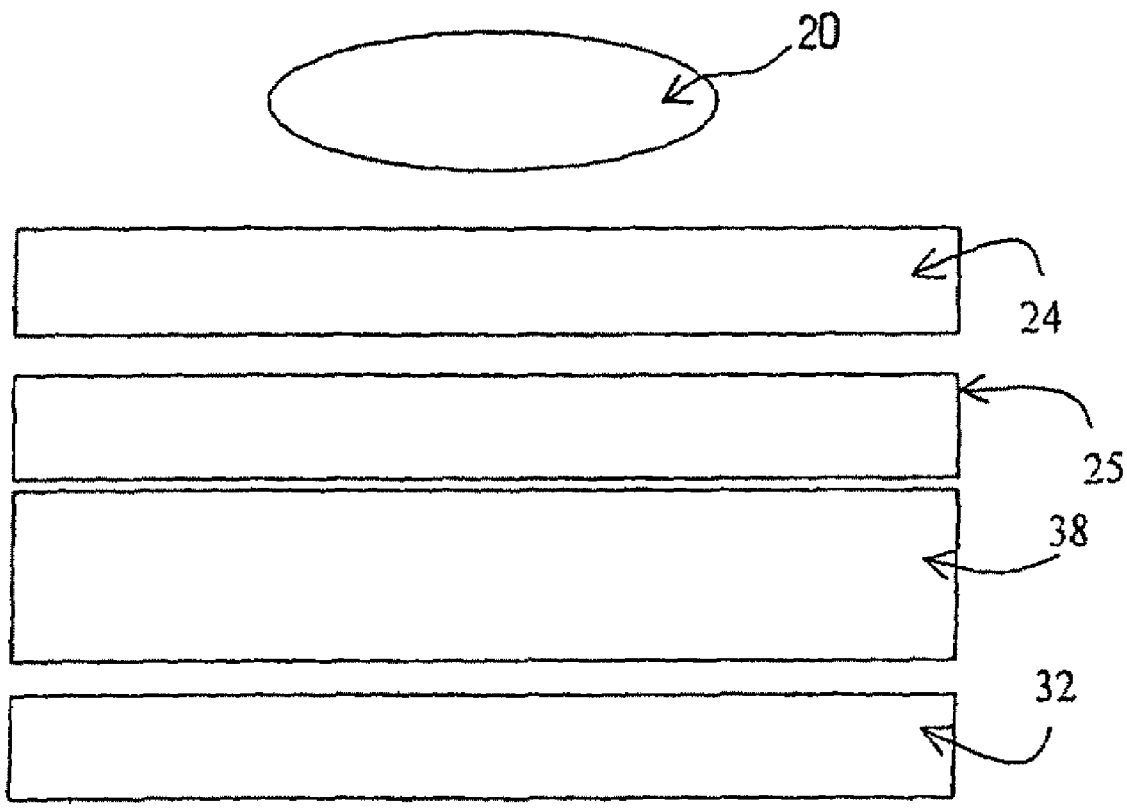
FIG. 14 illustrates the example of an optical stack for a single-polarizer reflective 2πBTN display according to the state of the art, taking into account the TAC substrate of commercially available polarizers.
Figure 15A:
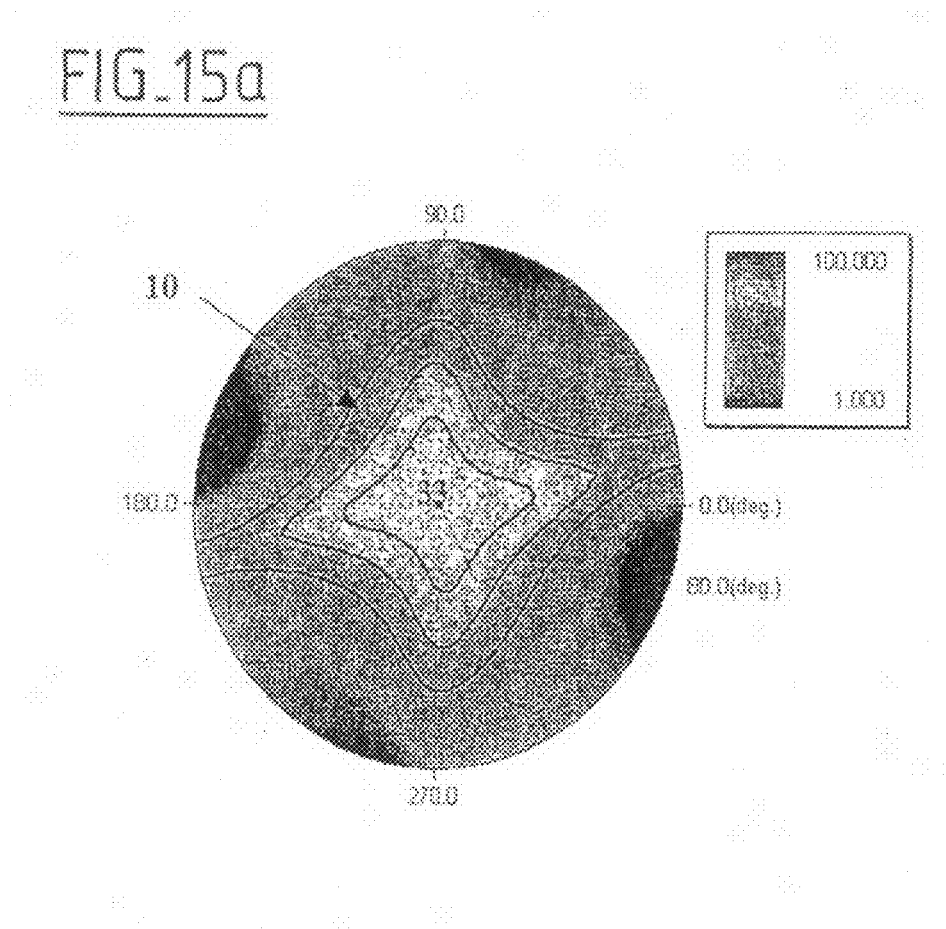
Figure 15B:
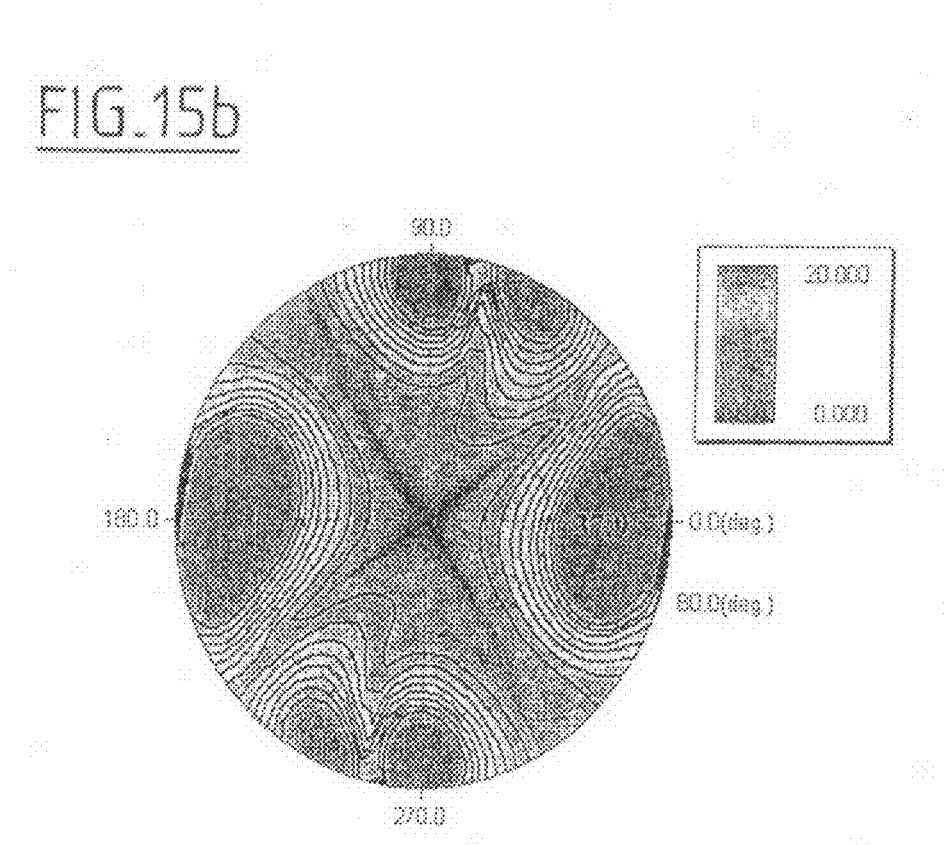
FIG. 15b illustrates color shift conoscopic diagram showing the iso-color shift contours from center outward of 2, 4, 6, 8, 10, 12, 14 and 16.

According to the invention two ranges for Nz and (nx−nz)·d are identified for the πBTN compensator, both of which improve the optical performance of πBTN displays for oblique viewing: a first range where Nz is between −∞ and 0 and (nx−nz)·d is between −150 nm and 0 nm, and a second range where Nz is between 0 and ½ and (nx−nz)·d is between 0 nm and 200 nm. By using biaxial retarders according to the invention in the first range, contrast ratio and color shift are both improved compared to πBTN both with TAC layers (FIG. 10) and without TAC layers (FIG. 8). Whereas by using biaxial retarders according to the invention in the second range, contrast ratio and color shift are improved compared to πBTN with TAC layers (FIG. 10), but only contrast is significantly improved compared to intrinsic πBTN without TAC layers (FIG. 8). Best compensation for contrast and color shift is obtained for retarders in the first range having Nz≦0 and the absolute value |(nx−nz)·d| smaller than or equal to the value of Δn·d of the LC layer (typically 90 to 175 nm), meaning smaller or equal to 175 nm. In both ranges |(nx−nz)·d|<200 nm.

Best results of compensation for Nz≠−∞ (meaning that the birefringent film has a determined slow axis x corresponding to nx>ny) have been obtained when the slow axis of the film is parallel or perpendicular to the polarizer axis, with some +/−−5° of tolerance.

Of course the present invention is not limited to the above described examples but extend to any embodiments in accordance with the enclosed claims.

What is claimed is:

1. A bistable twisted nematic (πBTN) liquid crystal display device comprising a liquid crystal layer (150) of thickness d, birefringence Δn and retardation Δnd, said liquid crystal layer being situated between two substrates (120, 180) and between a polarizer (100) and a reflector (200), said liquid crystal layer (150) in the absence of an applied electric field having two stable uniformly twisted textures, the twists of the two stable textures differing by an angle being equal mainly to 180°, and at least one compensation layer (110) positioned between said polarizer (100) and said reflector (200), said compensation layer (110) being composed of at least one birefringent film, said birefringent film having an optical anisotropy defined by three characteristic refractive indices nx, ny, nz, along three corresponding axis x, y, z of index ellipsoid, x and y being situated inside the substrates plane, nx and ny being called in plane indices, with nx≧ny, x being called slow axis, and z being perpendicular to the substrates plane (120, 180) with biaxiality parameter Nz equal to (nx−nz)/(nx−ny), characterized in that Nz lies between −∞ and ½ so that under oblique viewing the retardation of the stable texture corresponding to the dark state is compensated to improve the contrast ratio and simultaneously the retardation of the stable texture corresponding to the bright state is modified to decrease the color shift.

2. Device according to claim 1, characterized in that the birefringent film 110 is in the group comprising a uniaxial positive C plate (nz>nx=ny with Nz=−∞), a uniaxial negative A plate (nx=nz>ny with Nz=0) or a biaxial plate having either Nz<0 or 0<Nz<½.

3. Device according to claim 1, characterized in that the compensation layer (110) consists of a single retarder of the desired retardation.

4. Device according to claim 1, characterized in that the compensation layer (110) consists of a plurality of retarders whose total retardation when added together equals the desired retardation.

5. Device according to claim 1, characterized in that it comprises a compensation layer (110) on each side of the liquid crystal layer (150).

6. Device according to claim 1, characterized in that switching between the two stable textures is obtained by applying an electric field having at least one component perpendicular to the plane of the liquid crystal cell substrates (120, 180).

7. Device according to claim 1, characterized in that the twists of the two stable textures differing by an angle equal mainly to π is between 150° and 180°.

8. Device according to claim 1, characterized in that it comprises a compensation layer (110) between the polarizer (100) and the liquid crystal layer (150).

9. Device according to claim 1, characterized in that it comprises a compensation layer (110) on the reflector side, with respect to the liquid crystal layer (150).

10. Device according to claim 1, characterized in that Nz is comprised between −∞ and 0, corresponding to nz≧nx≧ny.

11. Device according to claim 1, characterized in that Nz is equal to −∞, corresponding to nz≧nx=ny.

12. Device according to claim 1, characterized in that Nz of the compensation layer (110) is between −∞ and 0 and the retardation (nx−nz).d is between −150 nm and 0 nm.

13. Device according to claim 1, characterized in that absolute retardation |(nx−nz)d| is smaller or equal to the LC retardation Δnd.

14. Device according to claim 1, characterized in that Nz is comprised between 0 and 0.5, corresponding to nx≧nz≧ny.

15. Device according to claim 1, characterized in that Nz of the compensation layer (110) is between 0 and ½ and the retardation (nx−nz).d is between 0 nm and 200 nm.

16. Device according to claim 1, characterized in that absolute retardation |(nx−nz)d| is smaller or equal to 200 nm.

17. Device according to claim 1, characterized in that the slow axis is parallel or perpendicular to the adjacent polarizer absorption axis with a tolerance of +/−5°.

18. Device according to claim 1, characterized in that the slow axis is parallel to the adjacent polarizer absorption axis with a tolerance of +/−5°.

19. Device according to claim 1, characterized in that the slow axis is perpendicular to the adjacent polarizer absorption axis with a tolerance of +/−5°.

20. Device according to claim 1, characterized in that the compensation layer (110) is composed of at least two birefringent films, one birefringent film having Nz=1.

21. Device according to claim 1, characterized in that the compensation layer (110) comprises one birefringent film having Nz=−∞.

22. Device according to claim 1, characterized in that the birefringent film (110) is part of the polarizer (100).

23. Device according to claim 1, characterized in that the d/p ratio is d/p≈0.25+φ/2π, φ being the twist of the lower twisted texture, d being the liquid crystal layer thickness or cell gap and p being the intrinsic pitch of the chiral nematic liquid crystal.

24. Device according to claim 1, characterized in that the liquid crystal layer (150) introduces a layer retardation between 90 nm and 175 nm.

25. Process of manufacturing a bistable twisted nematic (πBTN) liquid crystal display device, wherein said process comprising the steps of providing a liquid crystal layer (150) of thickness d, birefringence Δn and retardation Δnd, situated between two substrates and between a polarizer (100) and a reflector (200), said liquid crystal layer (150) in the absence of an applied electric field having two stable uniformly twisted textures, the twists of the two stable textures differing by an angle being equal mainly to 180°, and providing at least one compensation layer (110) positioned between said polarizer (100) and said reflector (200), said compensation layer (110) being composed of at least one birefringent film or retarder, said birefringent film having an optical anisotropy defined by three characteristic refractive indices nx, ny, nz, along three corresponding axis x, y, z of index ellipsoid, x and y being situated inside the substrates plane, nx and ny being called in plane indices, with nx≧ny, x being called slow axis, and z being perpendicular to the substrates plane with biaxiality parameter Nz equal to (nx−nz)/(nx−ny), said process being characterized in that Nz lies between −∞ and ½ so that under oblique viewing the retardation of the stable texture corresponding to the dark state is compensated to improve the contrast ratio and simultaneously the retardation of the stable texture corresponding to the bright state is modified to decrease the color shift.

* * * * *